United States Patent [19]
Reed et al.

[11] Patent Number: 5,819,102
[45] Date of Patent: Oct. 6, 1998

[54] FORMULA PROCESSOR HAVING CACHE MEANS FOR STORING AND RETRIEVING RESULTS OF PREVIOUSLY COMPUTED FORMULAS BASE ON IDENTIFICATION AND DEPENDENCY INFORMATIONS

[75] Inventors: David Reed, Wellesley; Alfred M. Blanchette, Milford, both of Mass.

[73] Assignee: Lotus Corporation, Cambridge, Mass.

[21] Appl. No.: 618,013

[22] Filed: Mar. 25, 1996

Related U.S. Application Data

[62] Division of Ser. No. 66,633, May 3, 1993, abandoned, which is a continuation of Ser. No. 743,497, Aug. 9, 1991, abandoned.

[51] Int. Cl.[6] .................................................... G06F 15/20
[52] U.S. Cl. ............................. 395/800.34; 364/736.01
[58] Field of Search ........................ 395/800.01, 800.23, 395/800.32, 800.34, 670, 672, 676, 376, 392, 562; 364/131–134, 700, 706, 716.011, 735, 736.01

[56] References Cited

U.S. PATENT DOCUMENTS

| | | | |
|---|---|---|---|
| 4,395,758 | 7/1983 | Helenivs et al. | 395/375 |
| 4,468,730 | 8/1984 | Dodd et al. | 395/425 |
| 4,589,067 | 5/1986 | Poster et al. | 395/800 |
| 4,771,380 | 9/1988 | Kris | 395/800 |
| 4,870,608 | 9/1989 | Kametani | 364/748 |
| 4,953,082 | 8/1990 | Nomura et al. | 395/650 |
| 5,021,991 | 6/1991 | MacGreger et al. | 395/650 |
| 5,062,041 | 10/1991 | Zuk | 364/200 |
| 5,088,048 | 2/1992 | Dixon et al. | 395/11 |

FOREIGN PATENT DOCUMENTS

| | | |
|---|---|---|
| 0272655 | 6/1988 | European Pat. Off. . |
| 0410778 | 1/1991 | European Pat. Off. . |
| 0423597 | 4/1991 | European Pat. Off. . |

OTHER PUBLICATIONS 80387 80–Bit CHMOS II Numeric Processor Extension data sheet, available from Intel Corporation, Literature Distribution, Mail Stop SC6–59, 3065 Bowers Avenue, Santa Clara, CA 95051, 1987.

80386 Hardware Reference Manual, available from Intel Corporation, 1986.

John L. Hennessy, Computer Architecture—A Quantitative Approach, Morgan Kaufmann Publishers Inc., San Mateo, CA, 1990.

(List continued on next page.)

*Primary Examiner*—Alpesh M. Shah
*Attorney, Agent, or Firm*—Kudirka & Jobse, LLP

[57] ABSTRACT

A formula processor which computes results for a group of formulas in which at least one formula uses the result of another formula. The formula processor receives the formulas from a host and returns computed results for the formulas to the host for storage in a main memory. Formulas are received as a sequence of tokens, each token describing operands or operations. The formula processor is pipelined; as one token is interpreted and processed by the formula processor, subsequent tokens are received. The formula processor uses a computation element which is capable of performing only certain operations; before attempting each operation described by a token, the computation element determines whether the operation can be performed by the computation element—if it can be performed, it is; otherwise, the host may perform the operation itself, or rewrite the operation so the formula processor can perform it. After the formula processor computes a result for a formula, it stores this result in a cache memory. Thereafter, the formula processor can retrieve the result stored in the cache memory and use the retrieved result to compute a subsequent formula. The operands to a formula may be values or pointers indicating how to locate values; the formula processor converts pointers into values when required for a computation by requesting resolution from the host microprocessor, or, alternatively, by retrieval from the cache.

3 Claims, 13 Drawing Sheets

OTHER PUBLICATIONS

Amsterdam, Jonathan; "Build a Spreadsheet Program;" *Byte*; v. 11n. 7; Jul. 1986; pp. 97–104, 106, 108.

Proceedings 1987 Symposium on Logic Programming, Aug. 31, 1997, San Francisco, CA, pp. 264–272, S. Dietrich, "Extension tables: memo relations in logic programming".

First International Workshop on Expert Database Systems 1986, pp. 293–305, E. Sciore and D. Warren, "Towards an integrated database–prolog system".

A. Aho et al., "Compilers principles, techniques, and tools," 1986, Addison–Wesley, U.S.

| SIGNAL | MEANING | RESPONSE |
|---|---|---|
| FPINIT | Initialize to known state. | Resets NS and TVS and clears cell cache and token buffers; all current/pending operations terminated. |
| FPSTART | Begin a formula. | Save previous formula state, if any; if too many formulas, return ERROR. Save passed cell coordinates (if any). |
| FPEND | End a formula | Return TOS value; resume previous formula, if any. |
| FPGIVENUM | Send a number to the FP. | Place number or string on number stack. |
| FPGETNUM | Get a number from the number stack. | Remove number or string from number stack and send it to CPU. |
| FPGIVETVS | Send a Type/Value to the FP. | Place Type/Value on TVS. |
| FPGETTVS | Get a Type/Value from the TVS. | Remove Type/Value from TVS and send it to CPU. |
| FPDUPN | Duplicate item on stack. | Pushes a copy of the identified element on stack. |
| FPSWAPN | Swap stack items. | Swaps the identified element with the TOS. |
| FPFREEN | Remove stack items. | Removes a specified number of elements from top of stack. |
| FPFORMULA | Send formula bytes to the FP. | Interpret formula bytes. |
| FPENDARRAY | Array transmission complete. | Resume normal operations. |
| FPGETSTATAX | Get status | Returns the control/status information |

FIG. 3A

| SIGNAL | MEANING | RESPONSE BY CPU |
|---|---|---|
| CPUARRAY | Send an array (range, string) of values (cells, parts of a string) to the FP. | Reads range, string pointer and begins FPGIVENUM, FPGIVETVS transmission sequence. |
| CPUVARIABLE | Send a single variable (cell, string) value to the FP. | Reads cell coordinates and transmits cell via a single FPGIVENUM, FPGIVETVS command. |
| CPUFORMULA | Send more formula bytes. | Sends next n bytes of formula. |
| CPUOFFLOAD | Offload oldest m NS and TVS entries. | Begin reading m entries via a repeated sequence of FPGETNUM and FPGETTVS commands. |
| CPURELOAD | Reload most recent offloaded NS and TVS entries. | Begin sending m entries via a repeated sequence of FPGIVENUM and FPGIVETVS commands. |
| CPUOPERATION | Perform an operation. | CPU executes the operation and returns the result. |
| CPUDONE | Cell recalc complete. | Check status/control word for validity of results. |
| CPUERROR | Error occurred during formula recalculation. | CPU terminates formula evaluation by issuing FPEND and sets results of computation to ERR. |

FIG. 3B

| OPERAND | DESCRIPTION | NS VALUE | TYPE | VALUE |
|---|---|---|---|---|
| 123 — TREAL | 10-byte Temporary Real | Number | TREAL | N/A |
| 125 — CREF | Single-cell reference | 0 | CELL | Cell Coordinates |
| 127 — SNUM | Encoded 4 byte real number | Number | TREAL | N/A |
| 129 — RANGE | Range coordinates | 0 | RANGE | Ptr to Range |
| 131 — STRING | String | 0 | STRING | Ptr to String |
| 133 — ABSRNG | Absolute range | 0 | RANGE | Ptr to Range |
| 135 — NAMEDRNG | Named range | 0 | NAMEDRNG | Ptr to Range Name |
| 137 — ERR | Error (number) | ERR | ERR | N/A |
| 139 — RNGERR | Error (invalid range) | 0 | RNGERR | Ptr to Error Range |
| 141 — BLANKBLOK | A range of elements, all of which are blank | 0 | BLANKBLOK | Number of blank elements |

FIG. 5

| TYPE | INDICATOR |
|---|---|
| TREAL | 000 |
| CELL | 001 |
| RANGE | 010 |
| STRING | 011 |
| NAMEDRNG | 100 |
| ERR | 101 |
| RNGERR | 110 |
| BLANKBLOK | 111 |

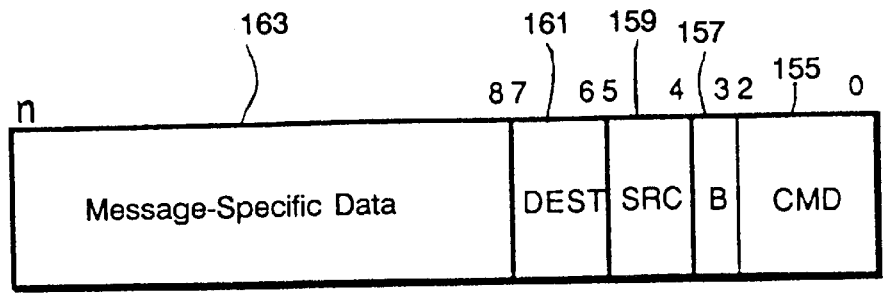

FIG. 8A

| MESSAGE | CMD | B | MEANING |
|---|---|---|---|
| Reset | 000 | 0 | Master machine reset; Return to known state (387 mode). |
| Save | 001 | 0 | Save current unit state. |
| Restore | 010 | 0 | Restore previous unit state. |
| Enter 387 Mode | 011 | 0 | Enter 387 mode. |
| Exit 387 Mode | 100 | 0 | Exit 387 mode. Resume FP functions if previously suspended by Enter 387 Mode command. |
| Unit Ready | 101 | 0 | SRC unit is ready to receive Point-to-Point transmissions. |
| Atomic Op | 110 | 0 | Beginning/end of Atomic operation. All units suspend use of CDB until Atomic Op received a second time. |
| Formula Done | 111 | 0 | Current formula interpretation complete. |

FIG. 8B

| MESSAGE | CMD | B | MEANING |
|---|---|---|---|
| Formula Bytes | 000 | 1 | n Formula bytes transmitted from ICU to TIU. |
| Execute Operation | 001 | 1 | Opcode of operation to be performed sent to OEU. |
| Resolve Stack Item | 010 | 1 | SMU resolves range or cell item on stack. |
| Send Stack Item | 011 | 1 | SMU sends the numbered item from the NS or TVS to the CPU. |
| Push Stack Item | 100 | 1 | SMU pushes the immediate operand onto the NS or TVS. |
| Restore Stack/End Restore | 101 | 1 | Sent from OEU to SMU, requests that previous stack offload be reloaded. Sent from SMU to OEU, indicates that restore complete (or no restore if no offload). |
| 387COMMAND | 110 | 1 | Sent from ICU to OEU whenever a 387 command/data is received. |
| CPUCOMMAND | 111 | 1 | OCU issues a command to CPU. |

FIG. 8C

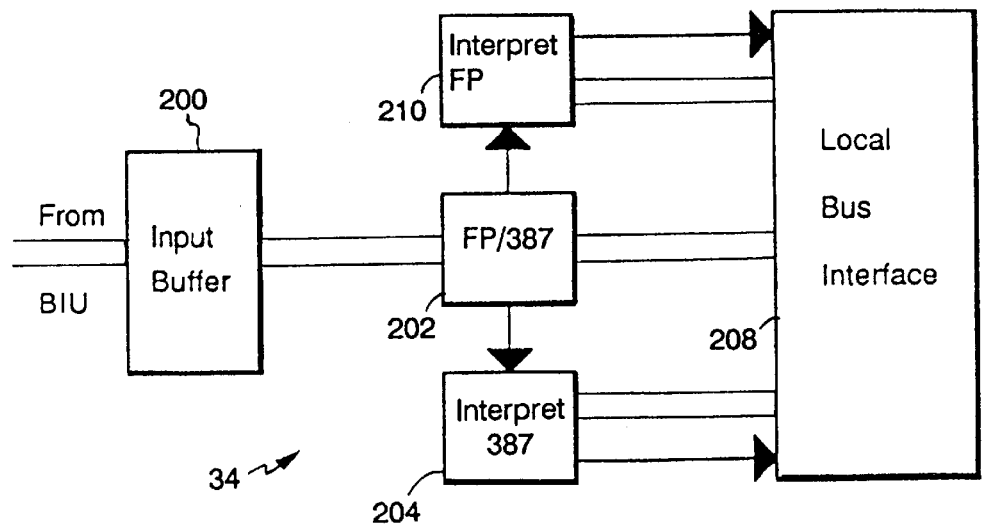

FIG. 9A

| | INPUT | MEANING | MESSAGE | DESTINATION |
|---|---|---|---|---|
| 49 | FPINIT | Initialize FP to known state. | RESET 165<br>SAVE 167 | Broadcast<br>Broadcast |
| 51 | FPSTART | Begin a formula. | SAVE 167 | Broadcast |
| 53 | FPEND | End a formula | RESTORE 169 | Broadcast |
| 55 | FPGIVENUM | Send a number to the FP | Push Stack item 189 | SMU |
| 57 | FPGETNUM | Get a number from the number stack. | Send Stack Item 187 | SMU |
| 59 | FPGIVETVS | Send a Type/Value to the FP | Push Stack Item 189 | SMU |
| 61 | FPGETTVS | Get a Type/Value from the TVS. | Send Stack Item 187 | SMU |
| 63 | FPFORMULA | Send formula bytes to FP | Formula Bytes 181 | TIU |
| 65 | FPENDARRAY | Array transmission complete. | Atomic Op 177 | Broadcast |
| 67 | FPGETSTATAX | Get status | Execute 183 Operation | OEU |

FIG. 9B

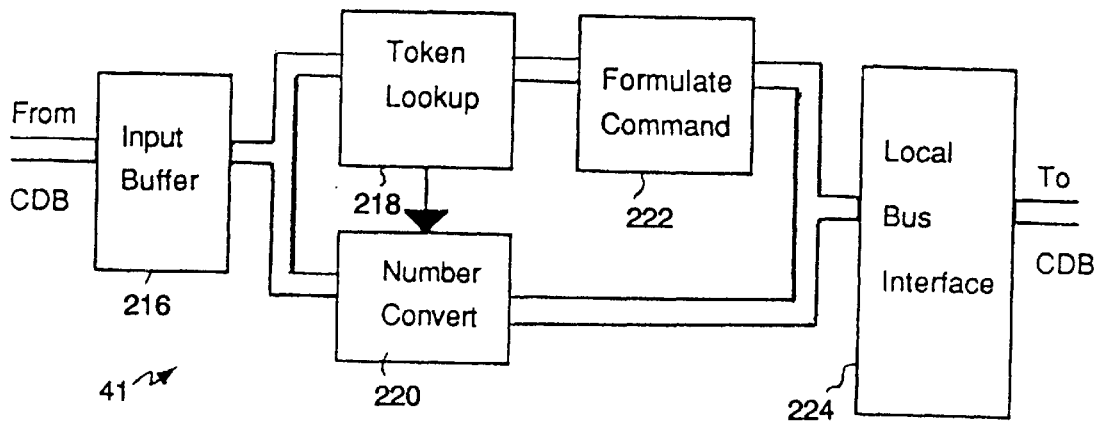

FIG. 11A

| OPCODE | MESSAGE | DESTINATION |
|---|---|---|
| 226 — OEU-Implemented Operation | Execute Operation 183 | OEU |
| 228 — Non-OEU-Implemented Operation | CPUCOMMAND 195 | OCU |
| 230 — Operand Operation (TREAL) | Push Stack Item 189 (Number) | SMU |
| 232 — Operand Operation (SNUM) | Push Stack Item 189 (Number) after conversion | SMU |
| 234 — Operand Operation (Any Range but ERRRANGE, Cell, String) | Push Stack Item 189 (Type/Value) and Push Stack Item 189 (Number = 0) | SMU |
| 236 — Operand Operation (ERR) | Push Stack Item 189 (Type/Value) and Push Stack Item 189 (Number = ERR) | SMU |
| 238 — Operand Operation (ERRRANGE) | Push Stack Item 189 (Type/Value) and Push Stack Item 189 (Number = ERR) | SMU |

FIG. 11B

| | INPUT | MEANING | RESPONSE |
|---|---|---|---|
| 167 | SAVE | Save current stack status | Save current stack pointer to Saved Stack Pointer; set stack pointer to next stack entry. |
| 169 | RESTORE | Restore previous stack status | Set stack pointer to Saved Stack pointer and increment by 1. |
| 179 | FORMULA DONE | Current formula computation done | Store TOS value in cell cache. |
| 189 | Push Stack Item | Push immediate item onto number or type stack | Push item onto NS or TVS. |
| 187 | Send Stack Item | Send number or type stack item to CPU | Pop item from NS or TVS. |
| 191 | Restore Stack | Reload stack from CPU (if previous offload) | If previous offload, get stack items from CPU and push onto stack. Issue END RESTORE message to OEU. |
| 171 | Enter 387 Mode | Enter 387 mode | Save top 8 NS entries onto Shadow Stack; save stack pointer to Shadow Stack Pointer; set Stack Pointer to 0. |
| 173 | Exit 387 Mode | Exit 387 Mode | Restore top 8 stack entries from Shadow Stack; set Stack Pointer to Shadow Stack Pointer. |
| 177 | Atomic Op | End of atomic operation | No response. |
| 185 | Resolve Stack Item | Resolve range, cell, or string item at TOS | Send CPU COMMAND message to OCU. |

FIG. 12B

FORMULA PROCESSOR HAVING CACHE MEANS FOR STORING AND RETRIEVING RESULTS OF PREVIOUSLY COMPUTED FORMULAS BASE ON IDENTIFICATION AND DEPENDENCY INFORMATIONS

This is a divisional of application Ser. No. 08/066,633, filed May 3, 1993, now abandoned, which is a continuation of application Ser. No. 07/743,497, filed Aug. 9, 1991, now abandoned.

BACKGROUND OF THE INVENTION

This invention relates to methods and apparatus for increasing the speed with which computers calculate values for complex formulas.

As microcomputers have become less expensive and more commonplace, the availability and complexity of microcomputer software has steadily increased, placing increased speed and functionality demands on microcomputer hardware. For example, contemporary data-management software allows the user to perform data retrieval and storage operations on very large files of data. This type of operation can strain the input/output capabilities of the microcomputer, and unless the software and the microprocessor hardware are carefully optimized for speed, such operations can be unacceptably slow. Furthermore, contemporary software for performing mathematical operations (e.g., spreadsheet software, which can be used for various financial or other mathematical analyses), requires the computer to not only perform data retrieval/storage operations, but may also require the microcomputer to repeatedly recalculate complex formulas. (A "formula", as the term is used here and in the following description, is a mathematical, logical, or string operation, or ordered sequence of such operations, which acts on one or more arguments to produce a result.) This type of software can strain not only the input/output functions of the computer, but also the computational power of the computer, and therefore can be even more drastically affected by less than optimal software or hardware design.

Traditional microcomputer designs are not well suited to these types of complex operations. In traditional designs, a single device, known as a general purpose microprocessor (typically a single computer chip), controls all input/output functions and also performs all computational functions. The microprocessor includes communications and timing circuitry which controls the operations of storage and interface components in the remainder of the microcomputer, and also includes circuitry which is responsible for performing computational tasks such as mathematical or logical operations. The difficulty with this traditional design is that, due to the wide variety of functions performed by the microprocessor, and cost and chip area limitations, the microprocessor design cannot be completely optimized for all of the functions it must perform.

In response to increasing pressure for performance, microcomputer hardware designers have modified the traditional microcomputer in several ways. Several techniques, some of which are discussed below, have been used to enhance performance. Often these techniques are combined for further performance enhancement.

One technique is to redesign the microprocessor circuitry to operate at greater speeds. This technique has the advantage that the microprocessor architecture remains unchanged, and thus existing software need not be rewritten to take advantage of the speed enhancement. However, unlike the other techniques described below, this technique does not optimize the microprocessor's architecture.

A second technique is to optimize the microprocessor architecture to increase the speed of some of the more common operations, e.g., the microprocessor may be designed to perform multi-step operations in fewer steps. This technique retains the cost advantages of a single-chip processor, but the optimizations typically increase the complexity of the microprocessor chip, and thus the amount of optimization that can be achieved is limited by the chip area. As a result, the speed of many operations may not be affected.

The above two techniques are illustrated by the instruction sets and relative speed of the "80*86" (8086, 80186, 80286 and 80386) family of microprocessor chips, which are successively faster versions of the traditional microprocessor design, and are described in various literature available from Intel® Corporation, Literature Distribution, Mail Stop SC6-59, 3065 Bowers Avenue, Santa Clara, Calif. 95051.

A third technique for increasing microprocessor speed couples the microprocessor to an additional computational engine, known as a coprocessor, which is carefully optimized to perform particular functions rapidly. Typically, the co-processor is designed to perform complex mathematical computations, such as multiplication and exponentiation, in an optimized fashion. The microprocessor is designed with a high-speed coprocessor interface (separate from the other interfaces of the microprocessor) so that it may quickly refer complex mathematical operations to the coprocessor rather than computing them with the microprocessor's own, less optimal, internal computation circuitry. The results generated by the coprocessor are then returned to the microprocessor through the coprocessor interface and used in subsequent computation, which may include further coprocessor operations. Coprocessor techniques are illustrated by the 80387 Numeric Processor Extension chip, which is designed for use with the 80386 microprocessor, and is described in data sheets and other literature available from Intel® Corporation at the address provided above.

Another, less-explored technique for increasing processing speed involves redesigning the microcomputer with multiple independent microprocessors, and designing software that allows the microprocessors to perform computations or input/output functions simultaneously and in parallel. However, cost and space requirements, as well as the compatibility of currently available software, have thus far limited the use of this last technique.

SUMMARY OF THE INVENTION

In one aspect, the invention features a formula processor which computes results for a group of formulas in which at least one formula identifies and uses the result of another formula. The formula processor receives the formulas from a host and returns computed results for the formulas to the host for storage in a main memory. After the formula processor computes a result for a formula, a cache memory stores this result. Thereafter, the formula processor can retrieve the result stored in the cache memory and use the retrieved result to compute a subsequent formula.

Preferred embodiments of this aspect include the following features:

The cache may have multiple entries, in which case each result computed by the formula processor is stored in the cache until the cache becomes full; thereafter, previously stored results are replaced with newly-computed results. The result to be replaced may be the least-recently-stored result in the cache, or the least-recently-used result in the cache.

The formulas may be topologically sorted before computation, generating dependency information which is transmitted to the formula processor along with the formulas. This dependency information may be used to locate those formulas which are not used by other formulas (these formulas are not stored in the cache). Alternatively, the dependency information may indicate the number of subsequent formulas which use each result; in this case, when a result in the cache must be replaced, the result selected for replacement is the result which is used by the fewest number of subsequent formulas, and it is replaced only if the number of subsequent formulas which use the replacing result exceeds the number of formulas which use the replaced result.

In another aspect, the invention features a formula processor which computes a result for a formula received from a host and returns the computed result to the host. The formula describes one or more operands and one or more operations to be performed on the values of the operands. The formula processor uses a computation element which is capable of performing only certain operations; before attempting each operation described by the formula, the computation element determines whether the operation can be performed by the computation element. If the operation can be performed by the computation element, it is; otherwise, the computation element tells the host that the operation cannot be performed.

Preferred embodiments of this aspect include the following features: When the formula processor cannot perform an operation, the host transmits to the formula processor a description of one or more alternative operations which produce the same result as the unknown operation. Alternatively, the host responds by doing the operation itself.

In another aspect, the invention features a formula processor which computes a formula. The formula describes one or more operands and operations to be performed on the operands. The formula processor includes an interface circuit which receives the formula from a host microprocessor as a sequence of tokens, each token describing operands or operations, and also communicates the computed result to the host microprocessor for storage in a main memory. A token interpreter circuit obtains the received tokens from the interface circuit and interprets the tokens. As one token is interpreted by the token interpreter, subsequent tokens are received by the interface circuit. After interpreting each token, the token interpreter forwards the operands and operations appropriately. Operands are forwarded to an operand storage memory where the operands are stored, and operations are forwarded to a computation circuit, which computes the result by performing the indicated operations on the operands stored in the operand storage memory.

Preferred embodiments of this aspect include the following features. The operands stored in the operand storage memory may be values or pointers indicating how to locate values; pointers are converted into values when required for a computation. Values may be obtained by requesting resolution of the value from the host microprocessor, or, alternatively, the formula processor may include a cache which stores previously-calculated results, and a value may be obtained by retrieving it from this cache. To facilitate storage of pointers and values, the stack may include type and value sections; the computation circuit can then determine whether an operand to be used in a computation is a value or pointer by checking the type section of the memory.

In another aspect, the invention features a method of organizing a group of formulas in which at least one formula identifies and uses the result of another formula. The formulas are sorted so that each formula which uses the result of a second formula is placed in a known position relative to the second formula. This sorting process also generates dependency information indicating whether the result of one or more of the formulas is used by other formulas.

Preferred embodiments of this aspect include the following features: More than one formula may store dependency information. The dependency information may identify which subsequent formulas use the formula, or may indicate the number of subsequent formulas which use the formula.

Other preferred embodiments combine one or more of the above aspects and features.

BRIEF DESCRIPTION OF THE DRAWINGS

FIG. 3A is a table of the tokens which may be transmitted from a host microprocessor to the formula processor of FIG. 2, and FIG. 3B is a table of the tokens which may be transmitted from the formula processor to the host microprocessor.

FIG. 5 is a table of the data types which may be stored in the stack of the formula processor of FIG. 2.

FIG. 8A is a diagram of the internal message format used by the formula processor of FIG. 2, FIG. 8B is a table of internal broadcast messages, and FIG. 8C is a table of internal point-to-point messages.

FIG. 9A is an architectural diagram of the input control unit of the formula processor of FIG. 2, and FIG. 9B is a table of the actions taken by the input control unit in response to tokens received from the host microprocessor.

FIG. 11A is an architectural diagram of the token interpreter unit of the formula processor of FIG. 2, and FIG. 11B is a table indicating how the token interpreter unit interprets tokens and generates internal messages in response.

FIG. 12B is a table indicating how the stack management unit interprets tokens and generates internal messages in response.

DESCRIPTION OF THE PREFERRED EMBODIMENTS

Figure 1:
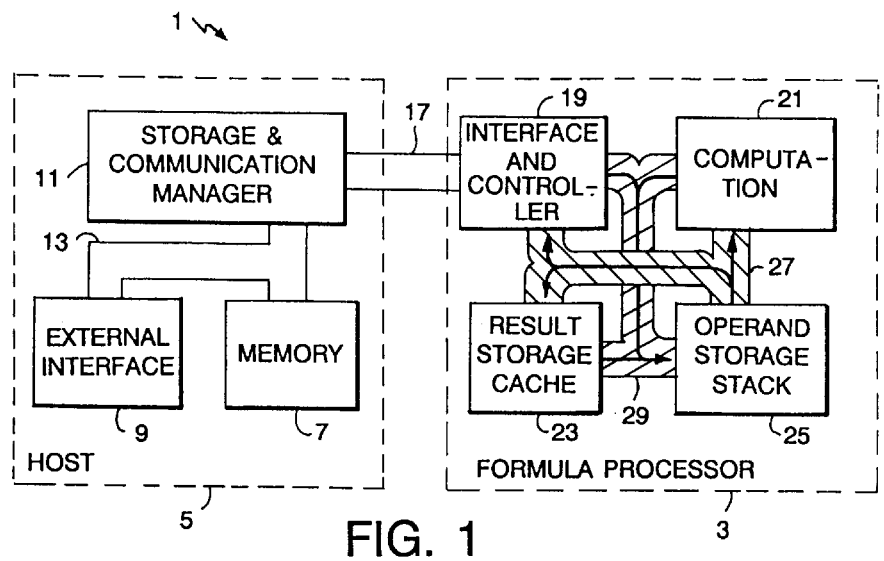
FIG. 1 is a functional diagram of a formula processor and a host which uses the formula processor for computational tasks.
Figure 2:
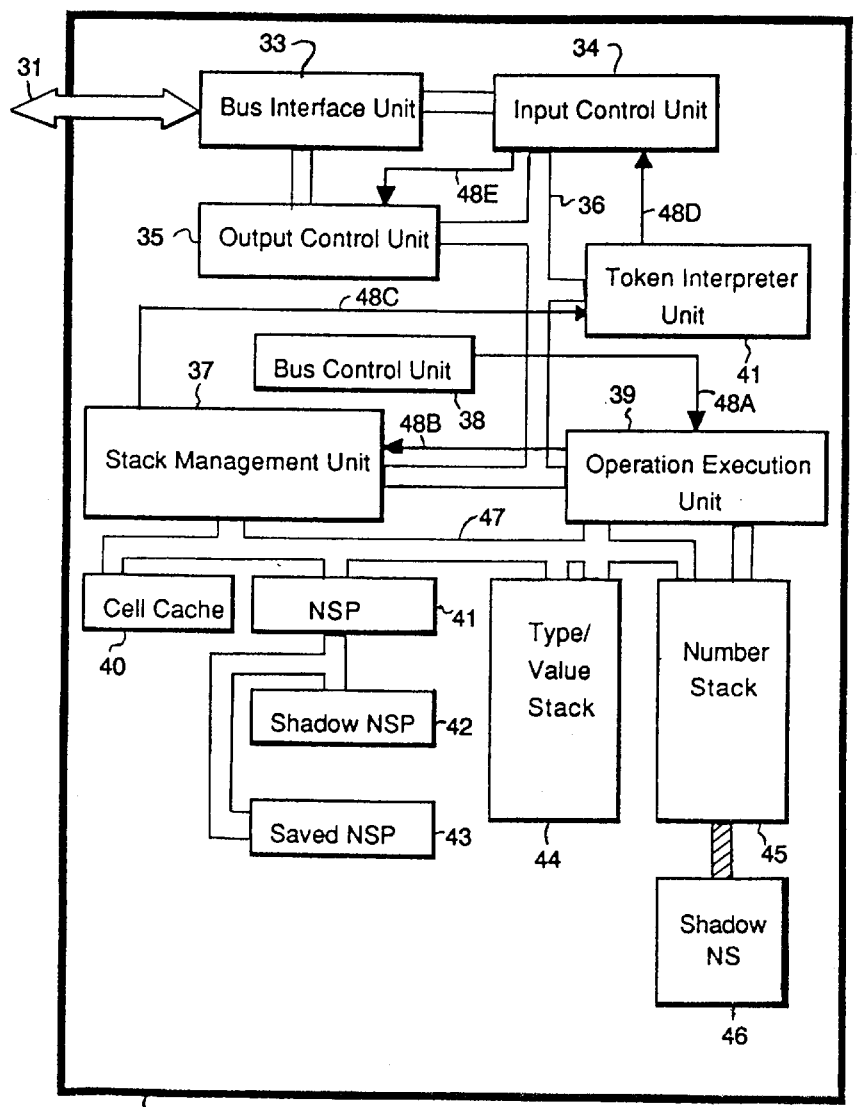
FIG. 2 is an architectural diagram of hardware embodiment of a formula processor for connection to a host microprocessor.

FIG. 1 illustrates a computer system 1 including a formula processor 3 which cooperates with a host 5. As an initial matter, it should be explained that FIG. 1 depicts the computer system in functional, rather than architectural form; that is, FIG. 1 illustrates, in diagrammatic form, the various functions performed by the computer system, rather than illustrating a particular design which performs those functions. FIG. 2 and the following figures depict one particular design using specific computer system components to perform the functions of the formula processor of FIG. 1; it should be understood, however, that the detailed description of FIG. 2 and the following figures merely illustrates one implementation of the functions of FIG. 1, and that there are numerous equivalent methods for performing the functions depicted graphically in FIG. 1.

It should also be understood that the functions illustrated by FIG. 1 may be implemented by custom designed computing circuitry (hereafter, such an implementation will be referred to as a "hardware" implementation), or, alternatively, the functions illustrated by FIG. 1 may be performed by programmable computing circuitry operating under the direction of a suitable program (hereafter, such an implementation will be referred to as a "software" implementation). Furthermore, it should be understood that multiple functions may be performed by one software- or hardware-implemented element, that is, that the same programmable computing circuit may be used to perform more than one of the functions depicted in FIG. 1 if the program is written appropriately. Also, one custom designed computing circuit, if suitably designed, may perform more than one of the depicted functions. Finally, it should be understood that hardware- and software-implemented functional elements may be combined to create the complete computer system. Thus, FIG. 1 and the accompanying description should be read as descriptive of software or hardware embodiments of a formula processor, or a combination hardware/software embodiment.

Now turning to the functions illustrated in FIG. 1, the host 5 generally performs the functions of a microcomputer, and operates under the direction of pre-programmed instructions and/or commands from a user. The operations of the host are controlled by a storage and communication manager 11, which manages the contents of a memory 7 and the operations of external interfaces 9. Memory 7 stores information to be used by the computer system as well as pre-programmed instructions which direct the computer system's operation. External interfaces 9 allow for communication of data to and from the computer system, and may include a user interface such as a terminal, mouse and/or keyboard for communicating data to and from a human user. Communications between the manager 11, memory 7, and interfaces 9 travel via a communications path 13.

As part of the execution of software programs, the host 5 may need to compute values for formulas. To compute a value for a formula, the host 5 communicates the formula to the formula processor 3, receives (after a brief delay) a computed value for the formula, stores this value in the appropriate location in memory 7 (for later retrieval and/or display to the user), and then continues to the next task, which may involve computing values for additional formulas with the aid of the formula processor 3. In addition, before, during, and after the above operations, the host may perform other services, such as servicing clock- or user-generated interrupts, and performing communications with the memory 7 and/or external interfaces 9.

The storage and communication manager 11 of the host 5 communicates formulas to the formula processor 3 over a communications path 17, and the formulas are received by an interface and controller element 19 in the formula processor 3. The interface and controller element 19 interprets the formula, coordinates the operation of the other elements of the formula processor 3 to compute a value for the formula, and returns this value to the host 5 via the communication path 17. For reasons that will be seen more clearly later, the formula is preferably transmitted as a sequence of tokens which represent numbers or operations. These tokens represent the formula in "reverse polish" notation, i.e., with the operands preceding the operator. For example, the formula "(3+5)*4" is transmitted as: a token representing the number 3, a token representing the number , a token representing the "+" operation, a token representing the number 4, and a token representing the "*" operation (in the following, this type of token sequence will be referred to with abbreviations such as "3, 5, +, 4, *").

The main elements of the formula processor 3 are the interface and controller element 19, a computation element 21, a result storage cache 23, and an operand storage stack 25, each of which may communicate with the other elements along one or more communications paths. To increase the clarity of the following description, two unidirectional communications paths, numbered 27 and 29, are illustrated in FIG. 1, with the direction of flow of information through the paths indicated by arrows. It should be understood, however, that many other communications arrangements would be suitable for performing the functions of the formula processor 3. For example, a hardware embodiment of a formula processor could utilize two mono-directional data busses arranged as illustrated in FIG. 1, or could utilize a single bi-directional data bus which connects to each of the elements in the formula processor, or a myriad of individual mono-directional or bi-directional busses connecting individual elements. A software embodiment of a formula processor could also have various communications arrangements. Note, however, that in a software embodiment, the communications paths would be different in nature, for example, a 'path' may be a storage register which is available to some or all of the software elements, rather than a bus.

The computation element 21 performs the fundamental operations of the formula processor 3. For example, the computation element may perform addition, subtraction, multiplication, and division operations, as well as logical operations such as AND and OR and string operations such as concatenation. The computation element 21 is designed to perform these operations rapidly and with high precision, e.g., quad precision (32 bits) or greater.

The computation element 21 receives operands for operations from an operand storage stack 25. The stack is a memory element which stores a sequence of numeric, logical, or string values. Values may be "pushed onto" (stored in) or "popped off of" (retrieved from) the stack in a last-in-first-out (LIFO) manner. The last value inserted onto the stack 25 (via path 29), which is known as the "top" of the stack, is the first value available for use by the computation element 21 or other elements 19 or 23 (via path 27); other values stored in the stack 25 may be obtained by sequentially popping them out.

As an example of the interoperation of the interface/controller 19, computation element 21, and stack element 25, consider the computation of the example formula:

(3+5)*4 which, as discussed previously, would be transmitted to the formula processor as the token sequence 3, 5, +, 4, *.

In response to this sequence, the formula processor would execute the following steps:

1. Stack element 25 pushes the value 3
2. Stack element 25 pushes the value 5
3. Computation element 21 pops the top two numbers off of the stack 25, adds these two numbers, and pushes the result onto the stack.
4. Stack element 25 pushes the value 4
5. Computation element 21 pops the top two numbers off of the stack, adds these two numbers, and pushes the result onto the stack.

After these steps are completed, the value of (3+5)*4(= 32) will be on the top of the stack 25, and can be returned to the host 5 via interface 19 (by popping the value out of the stack and transmitting it along path 27) or it may be retained in the stack 25 for further processing.

It will be appreciated that, because the formula is represented in reverse polish notation, the elements 19, 21, and 25 of the formula processor 3 may operate somewhat in parallel. After the interface/controller 19 receives and interprets a transmitted token and commands the stack element 25 or computation element 21 to take the appropriate action, the interface/controller 19 can begin receiving and interpreting the next token of the formula while the stack element 25 and/or computation element 21 are storing or making computations based on the previously-received token. In the above example, after the interface/controller 19 receives the first token of the formula (which represents the number 3) and commands the stack element 25 to push this number on the stack, the interface/controller 19 can begin receiving and interpreting the next token (representing the number 5) while the stack is processing the push instruction. Similarly, after the interface/controller 19 receives the last token of the formula (which represents the "*" operation) and commands the computation element 21 to perform a multiplication, the interface/controller can begin receiving and interpreting tokens from a subsequent formula while the computation element 21 is computing the requested product.

The final element of the formula processor is the cache element 23. Often, the applications software running on the host 5 will require the host to compute values for several interdependent formulas, i.e., formulas in which the value of one formula is an argument to another formula. For example, "spreadsheet" software is designed to compute values for tables of formulas which depend upon each other. To aid in calculating values for sets of formulas of this type, the formula processor 3 includes a result storage cache element 23. The cache 23 stores the values of formulas that have recently been computed by the formula processor 3. Using the cache 23, the formula processor may retrieve values for previously-computed formulas when these values are required by subsequent formulas, thus saving time; without such a cache, whenever the formula processor required the value for a previously-computed formula, it would need to retrieve this value by requesting it from the host 5 (typically, the host is programmed to store values in its memory 7 as they are computed and returned to the host by the formula processor.)

It should be noted at this point that, although there may be many formulas in a typical "spreadsheet" or other set of formulas to be computed, a cache which contains as few as one previously-computed value can be very useful. Empirical tests indicate that, for typical spreadsheets, over 90% of the formulas use the value of the next-previously-computed formula. Thus, even a one element cache, which stores the most recently computed formula value, and replaces this result each time a formula is computed, can perform very well.

The interoperation of the interface and controller element 19, computation element 21, result storage cache 23, and operand storage stack 25 can be best understood from the following example, in which the formula processor 3 computes values for the following two interdependent formulas:

$$X=(3+5)*4$$

$$Y=3-X$$

These two formulas would be transmitted to the formula processor as the following token sequences:

3, 5, +, 4, *, X

3, X, −, Y.

Note that the above sequences include an additional token not included in the sequences described before, namely, a final token containing an identifier which identifies the formula. For the purposes of this example, these identifiers are "X" and "Y", but it should be understood that other designations are possible; for example, in a spreadsheet program, the formula identifiers may be derived from the location of the formula in the spreadsheet.

In response to the above token sequence, the formula processor would execute steps 1–5 described in the above example, and would then execute the following additional steps:

6. Stack element 25 pops the value at the top of the stack 25, cache element 23 stores this value associated with the identifier "X", and interface/controller 19 transmits this value to host 5.
7. Stack element 25 pushes the value 3.
8. Cache element 23 retrieves the value associated with the identifier "X" and transmits this value to stack element 25, which pushes it onto the stack.
9. Computation element 21 pops the top two numbers off of the stack, adds these two numbers, and pushes the result onto the stack.
10. Stack element 25 pops the value at the top of the stack 25, cache element 23 stores this value associated with the identifier "Y", and interface/controller 19 transmits this value to host 5.

Thus, the previously computed value for formula "X", which is stored in the cache 23 in step 6, is reused by the formula processor in step 8 to compute a value for the subsequent formula Y, resulting in a substantial time savings.

It will be appreciated that, if the cache is of limited size and the number of interdependent formulas is large, it may not be possible to store all previously computed formula values in the cache, and it will be necessary to select a subset of the computed formula values for storage in the cache. In this case, it is possible that, during an operation such as step (8) above, the cache element 23 may fail to locate a previously computed value in the cache (a cache "miss"), and it will then be necessary to retrieve the value for the desired formula from the host, causing a significant delay.

To avoid this delay, it is necessary to select values for storage in the cache which are most likely to be used by subsequent formulas. There are several conventional cache management strategies that can be used to select this subset which may substantially increase the frequency with which a needed formula value is found in the cache (increase the number of cache "hits"). One such strategy is a "LRU" strategy which, when a new value has been computed, stores the new value in the cache in place of the least-recentlyused value in the cache. Other strategies, such as a random replacement strategy, may also be used. Note that, in the case of a very small cache, it may be expedient to simply replace the value that has been stored in the cache the longest. In the case of a one element cache, this last strategy may be implemented by simply replacing the value in the cache each time a formula is computed.

There are, however, other methods which can be used to increase the hit rate of the cache. Typically, applications programs (e.g., spreadsheet programs) that are capable of computing values for groups of interdependent formulas include a topological sort routine that re-orders the formulas before calculation. The formulas are in proper order for calculation if, for any pair of formulas X and Y, if Y contains a reference to (i.e., uses the value of) X, then Y follows X in the sorted order.

This sorting step can be used to advantage when managing the cache, because a fundamental part of the topological sort operation is analyzing which formulas of a group of formulas depend upon other formulas. This information is useful when determining which formula values to maintain in the cache; a formula whose value will be used by another formula which has not yet been calculated should be maintained in the cache, even if a conventional replacement strategy would otherwise replace it; conversely, a formula whose value will not by used by any subsequent formulas should not be maintained in the cache, even if a conventional replacement strategy would maintain it.

As an example, one possible way to use the dependency information gained through the topological sort to manage the cache is to count the number of formulas which depend from each formula (obtaining a "dependency count") during the topological sort. The dependency count is stored with the formula and transmitted to the formula processor along with the formula. Then, after the formula has been computed by the formula processor, the cache element 23 uses the dependency count to determine whether to store the computed value in the cache, and to determine how long to maintain the computed value in the cache. Formulas which have a zero dependency count (i.e., formulas whose values are not used by any subsequent formulas) do not have their values stored in the cache at all. Values for formulas with a non-zero dependency count are stored in the cache, but are stored along with the dependency count. Then, each time a value in the cache is used by a subsequent formula, the value's associated dependency count is reduced by 1. When a value's dependency count reaches 0, the value is erased from the cache. Finally, if the cache becomes full (every element in the cache having a nonzero dependency count), the cache management unit 23 first determines whether the formula to be inserted into the cache has a higher dependency count than the entries in the cache; if not, the value is not stored in the cache; otherwise, the value is stored in the cache in the place of the value in the cache having the lowest dependency count, thus minimizing the number of subsequent cache misses caused by an erasure.

An alternative way to improve the hit rate of the cache is to tailor the topological sorting algorithm to minimize the distance between formulas which require the values of other formulas and the formulas on which they depend. That is, write the sorting algorithm so that, for every pair of formulas X and Y, where X depends on the value of Y, X is as close as possible to Y (but after Y) in the final sequence of formulas. One sorting algorithm which tends toward this optimum is as follows: start with any initial ordering of the formulas, and analyze each formula for dependencies. If a formula X under analysis depends on a formula Y which does not precede it in the order, then modify the order so that Y immediately precedes X. After all formulas have been analyzed in this manner, the ordering will be in proper form for calculation, and in many cases the distances between pairs of dependent formulas will be minimized.

The latter alternative (tailoring the topological sorting algorithm to optimize the ordering of the formulas), has the advantage that it increases the cache "hit" rate without resorting to a complex cache management strategy, and without requiring the compilation of dependency data during the topological sort. For this reason, although the latter alternative may result in less-than-optimal cache usage, it requires much less cache management time than the other alternatives discussed, and therefore may be more efficient overall. The empirical performance data cited above (in typical spreadsheets, 90% of all formulas use the value of the next previous formula) was collected with a topological sorting algorithm that was "tailored" in the manner described above.

Detailed Description

Now turning to a particular embodiment of a formula processor, FIG. 2 illustrates a hardware formula processor having the functionality described with reference to FIG. 1. The formula processor 3 illustrated in FIG. 2 is a computer chip, designed for use in conjunction with a microprocessor chip performing the functions of the host 5 of FIG. 1. The formula processor communicates with the microprocessor via a bus 31. It is preferred to select a microprocessor which is designed for use with a coprocessor, such as the Intel® 80386; in this case, the formula processor may be connected to the microprocessor's coprocessor port, and may use the same hardware connections, communicate by re-use of the existing coprocessor protocols, and take advantage of the existing schemes for detecting the presence of the coprocessor. (Alternatively, the formula processor may be mapped into a region of high-speed memory, in which case it will be accessible to the processor by standard memory read/write protocols.) As will be seen below, where the formula processor uses the microprocessor's coprocessor interface, it is preferable to design the formula processor so that it serves both roles; that is, so that it is operable as both a formula processor and a standard coprocessor, allowing the microprocessor to obtain the functionality of both devices with a single chip. Unused coprocessor instructions can be used to enable and disable the formula processor, and to communicate data and instructions to and from the formula processor. This allows the formula processor to make use a standard interface, and also allows the microprocessor to detect the presence of the formula processor by a suitable variant of the method used to detect the presence of a coprocessor. This sort of design is described below.

Microprocessor interface

The interface with the microprocessor is managed by a bus interface unit BIU 33. The BIU is designed to perform the appropriate 80387-style handshaking with the microprocessor, and to receive input tokens from the bus 31 or drive output tokens onto the bus 31 according to the standard 80387 protocol. (Note also that the communications on the microprocessor side of the bus will be handled by the 80386 coprocessor interface hardware; this ensures, for example, that tokens will not be transmitted to the formula processor until the formula processor is prepared to accept them.) Since these bus protocols are established by the microprocessor, the design of the bus interface unit is substantially dictated by the microprocessor and interface option in use. For this reason, and because circuitry for communicating with microprocessor coprocessor ports (or data busses) is well known, the detailed architecture of the bus interface unit will not be discussed in further detail.

The tokens that the microprocessor may send to the formula processor are summarized in the table in FIG. 3A. The first token is FPINIT, which commands the formula processor to initialize to a known state. In response to this token, the formula processor clears its internal stack and its cell cache, and also clears all internal buffers (which will be discussed below) and terminates any current operations. After initialization, the formula processor issues a CPUDONE token 79 to the CPU (discussed below).

A second token that may be transmitted to the formula processor by the CPU is FPSTART 51. This command signals the start of a formula calculation; it contains an identifier for the formula being computed, and is followed by tokens for the formula. (In this particular embodiment, the formulas being computed are from a spreadsheet, and thus the identifiers are cell addresses; however, other identifiers may be used in other applications.) Although only the value is needed to perform computations, the formula processor saves the identifier (cell coordinates) as well for later use in storing the computed value in the formula processor cache.

The formula processor described herein is designed for use in multitasking environments, where multiple processors may be requesting computational functions from the formula processor at the same time. Thus, the formula processor may be interrupted during a formula calculation. In this case, the formula processor must save its internal state before servicing the interrupt, and restore this state after the interrupt has been serviced. Therefore, in response to the FPSTART command 51, the formula processor also determines if a formula is currently being computed, i.e., if there is a formula in process which is being interrupted by the FPSTART command. If so, the previous formula state is saved. If there is insufficient space to save the formula state (the present embodiment of the formula processor can only save one state at a time), a CPUERROR token 81 (see below) is issued to the host microprocessor.

The next formula processor token is the FPEND token 53. This is used to signal the end of the transmission of a formula. In response to this command, the formula processor could return a value, for example the value at the top of the stack; however, in an 80387 implementation such as the one described here, the FPEND command does not return a value because the 80386/80387 interface does not provide for automatic return of values by the coprocessor. Rather, the host microprocessor must read the values from the formula processor through additional commands, such as the FPGETNUM command described below.

The next seven tokens allow the host microprocessor to interact directly with the formula processor's stacks. As will be seen below, this allows the host microprocessor to aid the formula processor in computing arithmetic or logical functions which the formula processor cannot compute alone. The first token is the FPGIVENUM token 55, which allows the host microprocessor to send numeric data to the formula processor and place it on the stack. (It should be noted that the present implementation of the formula processor has two stacks which store corresponding data: a type/value stack 44 for storing data types and, in some cases, values, and a number stack 45 which stores multi-byte real numbers or characters of a string value). The FPGIVENUM pushes the number on the stack by placing the number on the number stack and placing a type indicator indicating a numeric type on the type/value stack. The FPGETNUM token 57 retrieves numeric data from the formula processor's number stack 45 by the reverse of the above steps. The FPGIVETVS token 59 pushes non-numeric data on the formula processor's stack by placing the appropriate value identifier at the top of the type/value stack and placing a null value in the corresponding location in the number stack (see FIG. 5). Finally, the FPGETTVS token 61 retrieves non-numeric data from the type/value stack 44 by the reverse of the above.

It should be noted that the 80386/80387 coprocessor interface protocol requires that data be transferred from the host microprocessor to the coprocessor (formula processor) in minimum-size blocks. As a result, it will be necessary to transmit several of the above tokens at once. If several transfers are needed, this will not present a problem, as the tokens can simply be transferred in a group. However, if only one transfer is desired, it may be necessary to fill out the transfer block, for example with repeated copies of the same transfer token.

The other three stack interaction tokens allow more complex manipulation of the stacks. The FPDUPN token 62 pushes a duplicate of a stack item on the top of the stack. The stack item to be duplicated is indicated by the FPDUPN token. For example, if the stack is storing has the following items:

X
Y
Z and the formula processor receives a FPDUPN(2) token indicating that the second item on the stack should be duplicated, the formula processor will manipulate the stack to appear as follows:

Y
X
Y
Z

The next token is the FPSWAPN 64, which swaps an indicated stack item with the item on the top of the stack. The stack item to be swapped is indicated by the FPSWAPN token. For example, if the stack has the following items:

X
Y
Z and the formula processor receives a FPSWAPN(3) token indicating that the second item on the stack should be duplicated, the formula processor will manipulate the stack to appear as follows:

Z
Y
X

The final stack manipulation token is the FPFREEN token 66, which removes an indicated number of stack items from the top of the stack. The number of items to be removed is indicated by the FPFREEN token.

The next token is FPFORMULA 63, which is used to transmit bytes of a formula, or encoded representations of operations to be performed by the formula processor. The FPFORMULA token includes one or more (up to a maximum number n) bytes of the formula, and includes an encoded count of the number of bytes incorporated. (Ordinarily, when FPFORMULA is being used to transmit formula bytes, each FPFORMULA token encodes n bytes. If fewer than n bytes remain in the formula, all of the remaining bytes are encoded; however, if the number of bytes in the formula is a multiple of n, the last FPFORMULA transmission has 0 bytes.) In response to the FPFORMULA token, the formula processor interprets the encapsulated bytes, and takes the appropriate action (this is discussed in more detail below).

The next token is FPENDARRAY 65, which is used to indicate the end of an array of values requested by the formula processor. See the discussion of the CPUARRAY token 69 below.

The final token which may be sent by the host microprocessor is the FPGETSTATAX token, which is used to get the contents of the formula processor's status register and place it at the host microprocessor's AX input. This command is used by the host microprocessor to determine the status of the formula processor.

As discussed above, in an 80386/80387-based implementation such as the one described here, communications from the formula processor to the 80386 host microprocessor can not be initiated by the formula processor in a unilateral fashion. Rather, communications must be instigated by the 80386 host microprocessor. However, the 80386 microprocessor must know when to request this information from the formula processor, e.g., it must know if the formula processor has completed a computation and is waiting for the host microprocessor to retrieve the result, or alternatively, if the formula processor has suspended a computation and is awaiting services from the host microprocessor (this possibility will be discussed in more detail below). To allow the 80386 host microprocessor to determine this information, it regularly obtains the formula processor's status using the FPGETSTATAX token. If the status of the formula processor indicates that it is awaiting action by the host microprocessor, the 80386 host microprocessor generates an interrupt which, when serviced, reads the appropriate information from the formula processor.

The FPGETSTATAX token may also be used in a multitasking environment to determine if the formula processor is currently computing a formula, and if so, whether the formula processor has room in its memory to store its current state if interrupted. In the implementation described herein, the formula processor interfaces to an 80386, and also performs the functions of an 80387 coprocessor; in this case, the formula processor's status word may be the same as the standard 80387 control word, with formula processor state information encoded into the two reserved bits in the standard 80387 control word. The reserved bits of the control word can be used as follows: "01"=no formulas in progress; "10"=formulas in progress, but state storage area available; "11"=formulas in progress and no state storage available.

The tokens that the formula processor may transmit to the microprocessor are summarized in the table in FIG. 3B. The first is the CPUARRAY token 69, which is used by the formula processor to request an array of values from the host microprocessor. Several types of numerical operations have a large number of values as arguments, e.g., an operation that computes the maximum value from a group of arguments. In spreadsheet applications, this group of arguments is often expressed as a range of locations, or cells, on the spreadsheet. The CPUARRAY token 69 allows the formula processor to ask the host microprocessor to retrieve values for each of the elements in such an array so that the formula processor may compute the value for the operation. This function could, of course, be performed in conjunction with the formula processor's value cache, thus avoiding the need for a CPUARRAY token 69. However, because the values in an array have sequential coordinates, it has been found that the host microprocessor can sequentially read the elements of the array from its memory about as fast as the formula processor can use these values in a computation, and thus there is no need to use the cache for this operation. Furthermore, by using the host microprocessor to generate the array values, the formula processor can avoid the time delays caused by a cache "miss", which will inevitably occur if the array values are read from the cache. Thus, in the present embodiment, the formula processor uses the host microprocessor to generate arrays of values.

The next token is the CPUVARIABLE token 71. This token is used to request the value of a single formula from the host microprocessor. The token includes an identifier for the formula (in the present implementation, the cell location). In response, the host microprocessor retrieves the value and type for the cell and transmits these to the formula processor via FPGIVENUM and FPGIVETVS tokens. (Note that string variables, which can be of variable length, can be retrieved using a token with functionality similar to that of the CPUARRAY token.)

The next token is the CPUFORMULA token 73. It is used while the host microprocessor is sending formula bytes (encapsulated in FPFORMULA 63 tokens), and indicates that the formula processor has processed all of the bytes that have been sent so far. In response to this token, the host microprocessor will send additional bytes of the formula, or an FPEND token 53.

The next two tokens are used to deal with stack overflow conditions. The CPUOFFLOAD token 73 is generated when the stack overflows, and is used to send a predetermined number (m) entries from the formula processor's stack to the host microprocessor for temporary storage in main memory, and the CPURELOAD token 75 is generated when the formula processor attempts to pop a previously-offloaded value from the stack. In response, the host microprocessor reads m entries from the main memory and reloads them into the formula processor's stack. (Note that these tokens will only be necessary if chip area limitations require the implementation of small stacks in the formula processor. If the stack is sufficiently large, these two tokens may not be necessary.)

The next token is the CPUOPERATION token 79. This token is used by the formula processor to request the host microprocessor to perform an indicated operation. This token is most frequently needed where the formula processor cannot perform an operation required as part of a formula calculation. For example, if the formula processor does not support a general exponential function, then a formula which includes an operation such as $4^3$ would not be understood by the formula processor. In this case, the formula processor generates a CPUOPERATION token 79 indicating the unrecognized operation. The CPU performs the necessary additional steps to complete the unrecognized operation, and then allows the formula processor to resume processing.

As an example, consider the exponentiation operation ($4^3$) discussed above. When computing this operation, the formula processor would receive a sequence of FPFORMULA tokens:

$$4, 3, \wedge$$

where the "^" represents the exponentiation operation. In response, the formula processor would (1) push the value 4 onto the stack, (2) push the value 3 onto the stack, and then, since the "^" would not be recognized, the formula processor would generate a CPUOPERATION token identifying the unrecognized "^" operation.

One way to identify the unknown operation is to transmit an index identifying the unknown operation in the stream of tokens being received from the host microprocessor. For example, if several tokens of a formula have been read into the formula processor, the index can identify the number of the unknown operation in this sequence. This method has the advantage that the formula processor can identify the unknown operation with a relatively small index number, rather than with a potentially much larger opcode. In addition, this method does not require that the computations of the formula processor be synchronous with the formula bytes transmissions from the host microprocessor; as seen below, this allows the formula processor to buffer formula bytes received from the host microprocessor until they are needed.

When the host microprocessor receives and indication of an unknown operation, it has two options. If the arithmetic/ logic unit (ALU) in the host microprocessor supports an exponentiation operation (or if there is host microprocessor software which uses the ALU to generate a suitable precise approximation of the exponential function), the host microprocessor can simply perform the exponentiation itself, by: (1) issuing two FPGETNUM tokens to the formula processor to pop the two arguments (4 and 3) off of the formula processor number stack 45, (2) using the host microprocessor's ALU to perform the operation on the two arguments, and (3) use the FPGIVENUM token to push the result back onto the formula processor stack. In this way, the host microprocessor can help the formula processor to complete the computation of a formula by computing those portions of the formula which are not understood by the formula processor.

A second, alternative way to handle a CPUOPERATION token involves restructuring the operation so that the formula processor itself can compute the desired result. For example, if the formula processor supports a logarithmic function, the host microprocessor can use this capability to compute exponential operations. The above example, $4^3$, can be rewritten with logarithms as Exp(Ln(4)*3). Thus, the host microprocessor can help the formula processor to compute $4^3$ as follows: after receiving the CPUOPERATION token, the formula processor stack will contain the following values:

3

4.

The formula processor then issues a FPSWAPN token to reverse the order of the arguments on the stack, and then one or more FPFORMULA tokens indicating the "Ln" (natural logarithm), "*" (multiplication), and "Exp" (natural exponent) operations. In response, the formula processor will first reverse the order of the two arguments, placing the value 4 at the top of the stack. Next, the formula processor will compute the natural logarithm of 4 and place the result at the top of the stack. Next, the formula processor will multiply the top two values on the stack and place the result at the top of the stack. Finally, the formula processor will take the exponential of the value at the top of the stack. The result, which is left at the top of the stack, is $4^3$ (=64).

It should be noted that the interface described above has significant advantages in speed and also in hardware and software extensibility. The speed advantage arises from the fact that the formula processor hardware, rather than the host microprocessor software, is responsible for determining which operations can and cannot be performed by the formula processor. That is, because of the above interface, the host microprocessor software can be written to "assume" that any operation in a formula can be performed by the formula processor (although the host microprocessor software must include special routines to handle those situations in which this assumption is incorrect). Thus, the microprocessor can transmit formulas to the formula processor without making any analysis of the operations used therein. Although this kind of analysis is eventually performed in the formula processor, it is performed by custom designed formula processor hardware, rather than by the microprocessor software, and therefore takes far less time than if performed by the microprocessor.

An extensibility advantage also arises from this interface. The microprocessor software can be changed to support additional operations without changing the formula processor hardware—all that is required is to add special routines in the microprocessor software that will perform the new operations after they are rejected (i.e., returned as a CPU-COMMAND token) by the formula processor. Furthermore, the formula processor can be enhanced to support new operations without requiring changes to the host microprocessor software. Because the host microprocessor software sends all operations to the formula processor, enhanced formula processors can simply perform those operations that previous formula processors rejected. The change will be transparent to the microprocessor software; the special routines designed to deal with previously unsupported operations will simply not be used.

The next token that may be sent to the host microprocessor is the CPUDONE token 81, which indicates that computation of the last formula transmitted has been completed. Typically, the next action taken by the host microprocessor is to check the status/control word (which may be retrieved by the FPGETSTATAX token) for the validity of the results.

Finally, the last token is the CPUERROR token, which indicates that an error occurred in computation of the formula. In response to this token, the host microprocessor terminates evaluation by sending an FPEND token, and then deals with the error appropriately; in a spreadsheet application, the value of the cell being computed is set to ERR.

Note that each of the above tokens may be sent from the formula processor to the host microprocessor unilaterally, or, in a 80386/80387-based implementation, the host microprocessor may request the tokens from the formula processor after the host microprocessor determines that the formula processor has a CPU token to be retrieved (by reading the formula processor's status/control word with a FPGET-STATAX token).

Figure 4:
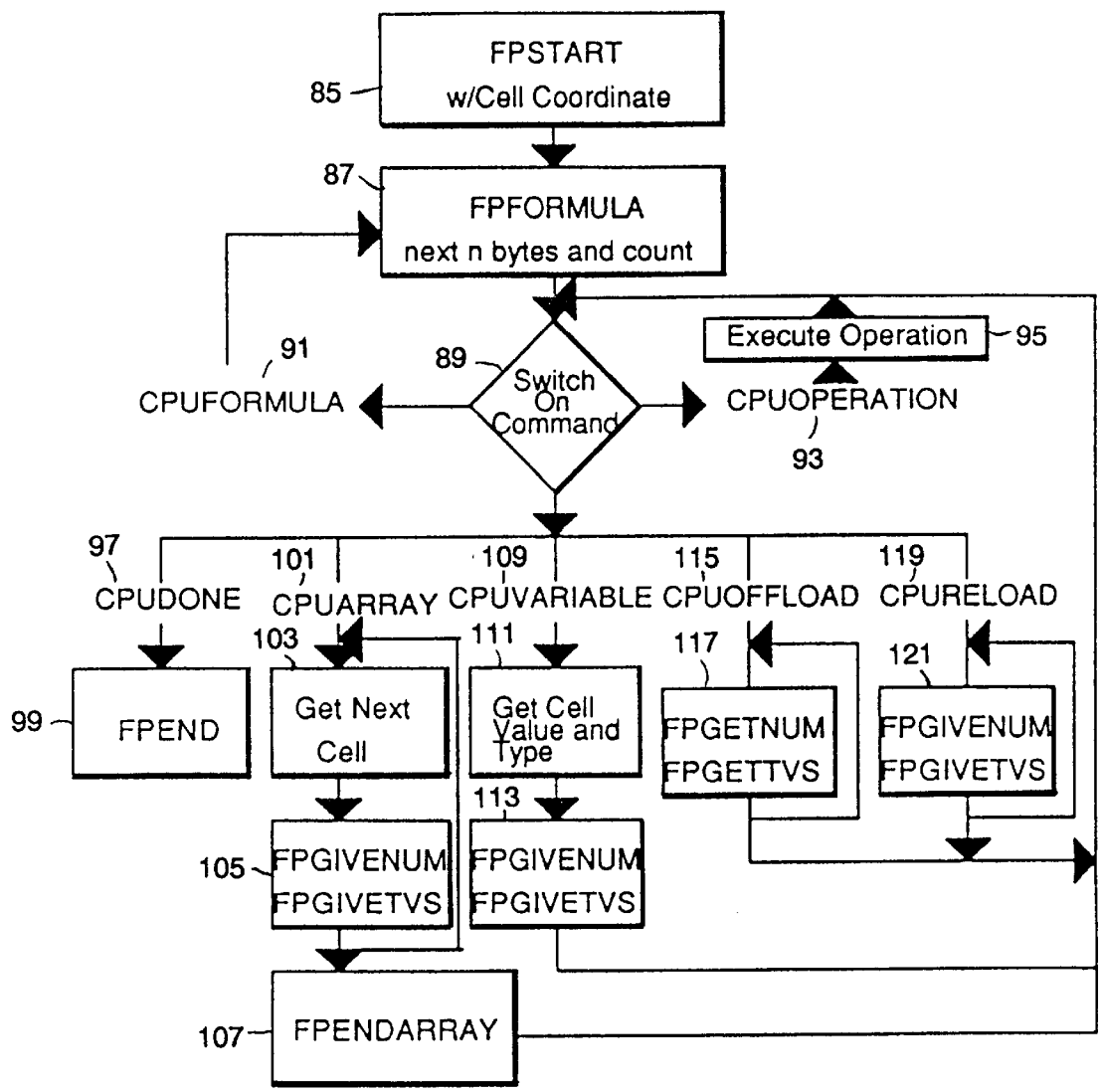
FIG. 4 is a flow chart for a program used by the host microprocessor when interacting with the formula processor of FIG. 2.

FIG. 4 is a flow chart describing the operations of the microprocessor while communicating with the formula processor. Communications are initiated when the host microprocessor issues 85 a FPSTART with a cell coordinate to the formula processor. The host microprocessor then issues 87 a FPFORMULA command encoding the first few bytes of the formula to be computed. The host microprocessor then waits for a response from the formula processor (in an 80387 implementation, by polling the formula processor's status word), and branches 89 based on the response received:

If a CPUFORMULA token is received 91, the host microprocessor transmits 87 additional formula bytes and waits 89 for the next response from the formula processor.

If a CPUOPERATION token is received 93, the host microprocessor executes 95 the appropriate operation (which may involve reading and writing information to and from the formula processor, as discussed above), and then waits 89 for the next response from the formula processor.

If a CPUDONE token is received 97, the host microprocessor issues 99 a FPEND token, and then proceeds to analyze the status word and/or read the top-of-stack value from the formula processor.

If a CPUARRAY token is received 101, the host microprocessor retrieves 103 the value of the first cell of the array and transmits 105 it to the formula processor via a FPGIVENUM or an FPGIVETVS token. If there are additional values in the array, the host microprocessor retrieves 103 these values and transmits 105 them to the formula processor. After all values have been transmitted, the host microprocessor transmits 107 a FPENDARRAY token, and then waits 89 for the next response from the formula processor.

If a CPUVARIABLE token is received 109, the host microprocessor obtains 111 a value for the indicated cell from main memory, transmits 113 it to the formula processor via a FPGIVENUM or FPGIVETVS token, and then waits 89 for the next response from the formula processor.

If a CPUOFFLOAD token is received 115, the host microprocessor sequentially reads 117 the indicated number of values from the formula processor stack via a FPGETNUM or a FPGETTVS token and stores these values in main memory. After these values have been read, the host microprocessor waits 89 for the next response from the formula processor.

If a CPURELOAD token is received 119, the host microprocessor sequentially writes 121 the indicated number of values from main memory into the formula processor stack via a FPGIVENUM or a FPGIVETVS token. After all values have been written to the formula processor stack, the host microprocessor waits 89 for the next response from the formula processor.

Stacks

To facilitate the following description of the formula processor 3, it is useful to briefly describe the structure and operation of the formula processor stacks.

As discussed briefly above, there are two stacks, a type/value stack 44 and a number stack 45. The type/value stack 44 stores an indication of the data type of the information stored in the number stack. The possible data types are enumerated by the table of FIG. 5. The NSVALUE column indicates the value stored in the number stack, and the TYPE and VALUE columns indicate the type identifier and value (if any) stored in the type/value stack. (Note that, in an alternative embodiment, the value field of the type/value stack could be eliminated, and the values stored in the number stack.)

Temporary real numbers 123 (i.e., intermediate values generated during a computation) are stored on the stack in a 10-byte (80 bit) format. The 10 byte value is stored in the number stack. The value field of the type/value stack is not used.

Single-cell (i.e., formula value) references 125 may also be stored on the stack. As will be seen in the following discussion of the operation of the stack management unit, single cell references are often stored in the stack in an unresolved form, i.e., as a pointer to the cell rather than as the cell's value (the stack may also contain unresolved references to ranges or strings, as will be elaborated below). When a value for the cell is needed (i.e., when the formula processor attempts to perform a computation on the cell value), the formula processor obtains the value of the cell (through a CPUOPERATION call) from the host microprocessor and places it on the stack in the place of the cell reference. In a CREF type entry, the number stack contains the value 0, the type field of the type/value stack indicates that the entry is of the type "CELL", and the value field of the type/value stack contains the cell coordinates.

Short numbers (i.e., numbers which are represented by less bits than the IEEE standard of 10 bytes) can be stored in the stack in the same manner as TREAL numbers. The number is converted to a 10 byte format (see below) before it is stored on the number stack.

Ranges are stored in the stack in an unresolved form, as a RANGE data type 129. The type field contains the range identifier, and the value field contains a pointer to the beginning and ending cell of the range (if the beginning and ending cells are in the same row or column, the cells in the range are the cells between the beginning and ending cells; alternatively, if the beginning and ending cells are not in the same row or column, the cells in the range are the cells in the rectangle of cells whose diagonally opposed corners are the beginning and ending cells).

Two additional range data types, ABSRNG 133 and NAMEDRNG 135 are used for special types of ranges. A named range is a range which has been associated with a name, and may be referred to by name in formulas rather than by its endpoints. Named ranges are stored using the NAMEDRNG identifier in the type field of the type/value stack; however, the value stored in the type/value stack is a pointer to the range name, rather than a pointer to the range itself. This allows the formula processor to use the range name request the endpoints and contents of the cells in the range from the host microprocessor when the range needs to be resolved.

An absolute range is a range whose endpoints will not change if the formula which identifies the range is copied from one cell to another. Ordinarily, cell references in a formula are "relatives"; when a formula is copied from one cell to another, all relative references in the formula are moved by the same distance in rows and columns as the distance between the cell being copied and cell to which it is being copied. Absolute cell and range references, however, are not changed in this manner.

In the formula processor stack, absolute ranges are stored in the same manner as relative ranges. Although the host microprocessor distinguishes absolute and relative ranges (so that they may be copied correctly), since the formula processor is not responsible for copying ranges, absolute ranges are stored in the same manner as relative ranges.

Strings are stored as a STRING data type 131. The string is initially stored unresolved, i.e., the value field of the type/value stack stores a pointer to the string in main memory. When the string is needed for an operation, the bytes of the string are retrieved (by a CPUOPERATION call) from the host microprocessor and pushed onto the stack (typically into several stack entries). At this point, the value field of the first component of the string contains the number 0, the second component contains the value 1, and so on, and the last component contains all 1's in the value field.

Error cells are created when a formula calls for an invalid operation (e.g., divide by zero, numeric operation on a string or range data type). Error cells are stored as an ERR data type 137, with the number stack storing an ERR value (for example, all 1's). Error ranges are created when a range is defined in an invalid manner (e.g., outside of the bounds of the workspace). These are stored, in unresolved form, as a RNGERR data type 139, with the number stack storing a 0 value and the value field of the type/value stack storing a pointer to the erroneous range.

The final data type is a blank block, which is a range of cells which are all blank. The blank block data type is used to store large areas of the spreadsheet which do not contain any values. Blank blocks are stored as a BLNKBLOK data type 141, with the value field indicating the number of blank cells in the block.

Figures 6A, 6B:
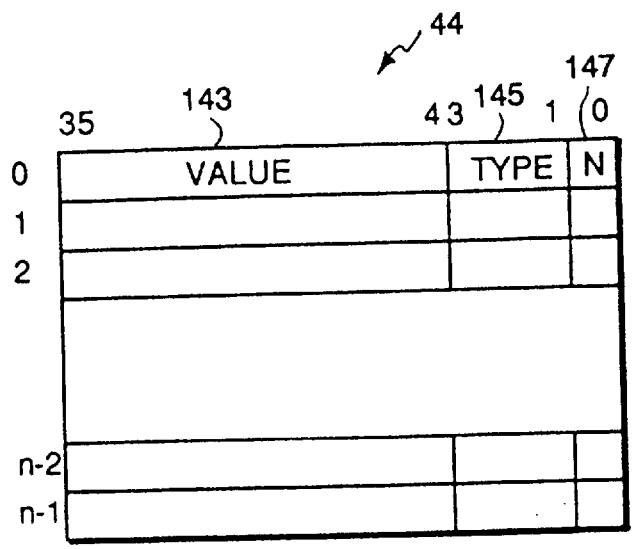
FIG. 6A is an illustration of the type/value stack of the formula processor of FIG. 2.
FIG. 6B is a table of the type indicators used by the type/value stack.

FIG. 6A illustrates the type/value stack 44. The type/value stack has the same number of entries as the number stack, and should be as long as possible: at least 8 entries. As illustrated, the format of the type/value stack includes a value field 143 which comprises the leftmost 32 bits of each stack entry, a type identifier field 145 which uses the next 3 bits (the bit values for the various identifiers are enumerated in FIG. 6B), and a final bit 147 which is used as a new flag. The new flag indicates when new information has been stored on the stack. The new flag 147 is set by the stack management unit 37 (FIG. 2) whenever it loads a value onto the corresponding location in the number stack, and is also set when the operation execution unit 39 places the result of a computation on the stack. The flag is cleared whenever the operation execution unit 39 uses the corresponding location in the number stack.

One example of the use of the new flag is as follows: the operation execution unit 39 needs to use an unresolved value (e.g. a cell reference) stored at the top of the stack. It requests resolution of the value by the stack management unit 39, and then repeatedly polls the new flag of the top-of-stack value until it detects that the new flag 147 has been set. This indicates that the stack management unit 37 has resolved the desired value and stored it on the top of the stack, and that it may be used in a computation.

Figure 7:
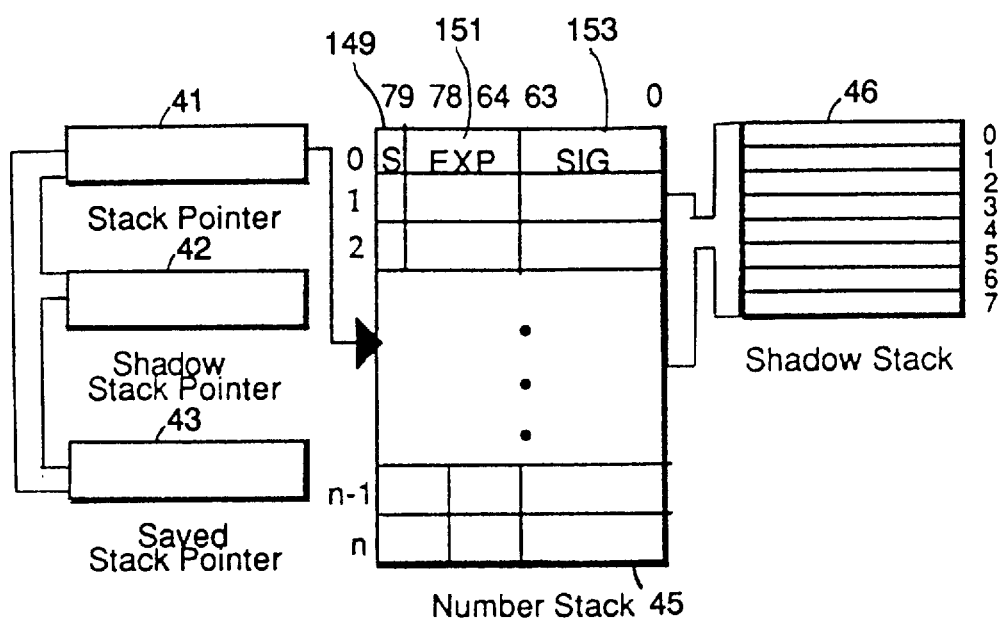
FIG. 7 is an illustration of the number stack of the formula processor of FIG. 2.

FIG. 7 illustrates the number stack. Numbers are expressed in scientific notation; the leftmost bit 149 of each stack entry is a sign bit, which is followed by a 15 bit exponent field 151 and a 64 bit significant digits field 153. It will be noted that this format is identical to that used in the 80387, which enhances compatibility.

The current location of the top of both the number and type/value stacks is indicated by the stack pointer, which is stored in a register 41 that is accessible to the stack management unit 37 (see FIG. 2). To facilitate stack management, the stack grows downward from the first entry (address 0), that is, the first element pushed on the stack is placed at address 0, the next element at address 1, and so on. Thus, a push involves storing the value in the location at the location indicated by the stack pointer, and incrementing the stack pointer. A pop involves retrieving the value in the location just before that indicated by the stack pointer, and decrementing the stack pointer.

As discussed above, the formula processor is configured to allow simultaneous computation of two formulas; the computation of a first formula may be interrupted to allow the computation of a second formula (e.g., as a result of a CPUCOMMAND, or in a parallel processing environment). To provide this function, the formula processor must protect the current stack contents during the interruption so that the stack may be restored to its former state after the interruption. This is achieved as follows: (1) The total stack area that may be used during formula computation is limited to ½ of the total number of elements. Thus, in the case of a n-element stack, the first formula cannot use stack elements beyond address n/2, and the second formula cannot use stack elements beyond address n (the stack will not roll-over). As a result, the interrupting formula cannot overwrite stack elements that were stored by the interrupted formula. (2) When a formula is interrupted, the current value of the stack pointer register 41 is copied to the saved stack pointer register 43. Thereafter, additional values may be pushed onto the stack, incrementing the stack pointer 41 beyond this top-of-stack value. After the interrupt is completed, the value in the saved stack pointer register 43 is copied back into the stack pointer register 41, allowing the formula processor to restart processing with the stack in its former state, and effectively 'flushing' any values left on the stack by the interrupting formula.

A second function, which has also been discussed above, is the ability of the formula processor to interrupt formula calculations to operate as an 80387 coprocessor. This requires the stack to operate as an 80387 stack, while saving the stack values needed for later formula calculations. This function is performed as follows: When the formula processor switches to 80387 emulation, the top 8 entries on the number stack are copied into an 8 entry shadow stack 46 for later use. (Note that the 80387 stack is only 8 elements long, and thus the formula processor need only save the top 8 elements in the stack when entering 80387 operation; also note that the 80387 does not have a type/value stack, so it is not necessary to save the contents of the type/value stack). As the top 8 elements of the stack are being saved, the current value of the stack pointer is copied to a shadow stack pointer register 42. The formula processor then enters its 80387 mode, and the top 8 entries of the stack are used in 80387 calculations. When the 80387 calculations are complete, the formula processor restores the top 8 elements of the stack from the shadow stack memory 46, and copies the stack pointer value stored in the shadow stack pointer register 42 into the stack pointer register 41. The formula processor can then continue the interrupted formula calculation.

Internal Commands

Referring to FIG. 2, the several functional units 34, 35, 37, 39, 41 of the formula processor 3 communicate with each other via a common data bus (CDB) 36. To facilitate the flow of information, the common data bus 36 is as wide as possible, at least 32 bits. Briefly, the functional units on the this bus are the input control unit (ICU) 34 and output control unit (OCU) 35 (which are responsible for received tokens from and communicating tokens to the host microprocessor), the token interpreter unit TIU 41 (which interprets communications from the microprocessor), the stack management unit SMU 43 (which manages the formula processor's stack and cache), and the operation execution unit OEU 39 (which performs the formula calculations); each will be described in more detail below.

The communications between the functional units is in the form of encoded messages, the format of which is illustrated in FIG. 8A. The rightmost field of the message is a 3-bit CMD field that indicates the type of message. The various types of messages that may be used are tabulated in FIGS. 8B and 8C, and will be discussed below.

The next field in the message is a 1-bit broadcast flag 157. When cleared, this flag indicates that the message is addressed to all of the functional units (i.e., is a broadcast message); when set, the flag indicates that the message is addressed to only one of the functional units (i.e., is a point-to-point message). Broadcast messages are interpreted by every functional unit on the CDB, and typically perform general operations such as resetting the formula processor. Point-to-point messages, on the other hand, are interpreted only by the destination unit, and are used only for specific operations.

The next two fields in the message are 2-bit fields that indicate the source (159) and destination (161) of the message. These bits encode the sources and destinations as follows: 00=OEU 39; 01=SMU 37; 10=TIU; 11=ICU 34 (when a source) or OCU 35 (when a destination).

The remaining bits of the message (which may comprise 24 or more bits) are a data area 163 that stores message-specific information. (Note that broadcast commands do not use the data area because they are complete without additional information; however, point-to-point commands include additional parameters such as formula bytes in the data area.) If additional space for message-specific information is needed, additional message bytes may be transmitted following the initial byte illustrated in FIG. 8A, but without the rightmost 8 bits of identification information—it is not necessary to couple these additional bytes to the first message, because the transmitting unit will mark the end of the message by relinquishing control of the bus, and the bus arbitration scheme (described below) allows the receiving unit to monitor when the transmitting unit has relinquished control of the bus and thereby determine that the entire message has been transmitted.

The various types of messages are tabulated in FIGS. 8B and 8C. The CMD column 164 of the table indicates the bit values used in the CMD field 155 of the message, and the B column 166 of the table indicates the value of the broadcast field 157 of the message. As FIG. 8B tabulates only broadcast messages and FIG. 8C only point-to-point messages, the B flag is cleared for every message in FIG. 8B and set for every message in FIG. 8C.

The first broadcast message in FIG. 8B is the Reset message 165, which commands all of the functional units to initialize to a known state. It is typically used before a formula calculation to flush the stacks and buffers (see below) and terminate any pending operations.

The next broadcast message is the Save message 167, which commands the functional units to save their current state. It is used as part of an interrupt by a second formula, and causes the stacks, buffers, and other state information to be saved for future use.

After an formula interrupt is completed, the Restore message 169 is used to instruct the functional units to retrieve stored stack elements, buffer contents, and other state information to restart formula calculation.

A switch to 80387 operation is preceded by an Enter 387 Mode message 171, which causes the functional units to save their current state. In addition, the stacks are readied for 80387 operation by saving the top of the stack and the stack pointer as described above. After the 80387 operations are complete, the Exit 387 Mode message 169 is used to return the formula processor to the state it held prior to the 80387 operation.

The units indicate that they are prepared to receive data by transmitting a Unit Ready message 175. This allows the units to control data the flow of messages to itself. For convenience, each of the functional units which originates messages stores a flag indicating the state of readiness of the other units on the bus. When a unit receives a Unit Ready message from another unit, it sets the ready indicator for the source unit, and then may proceed transmitting messages (if any) to the unit. Units can only receive point-to-point messages after they have transmitted a Unit Ready message.

The Atomic Op message 177 is used to lock units out of the CDB while heavy traffic is passing between the stack and the host microprocessor. After receiving this message, the units not involved with the communication lock themselves out of the bus, and do not use the bus until a second Atomic Op message (indicating that the bus is available) is received.

The last broadcast message is the Formula Done message 179, which indicates that the formula currently being computed has been completed. In response, the stack is cleared (unless the result of the formula is a string, in which case there may be additional bytes of the string residing on the stack).

Referring to FIG. 8C, the first point-to-point message is the Formula Bytes message 181. This message is used to transmit bytes of a formula received from the host microprocessor to the TIU 41 for interpretation.

The next message is the Execute Operation message 183. This message is used to send an opcode to the OEU 39 to command the OEU to perform an operation (e.g., a numeric operation on one or more values at the top of the stack).

The next message is the Resolve Stack Item message 185 which is sent to the SMU 37 to request resolution of an unresolved cell or range at the top of the stack.

The Send Stack Item 187 and Push Stack Item 189 messages are used to command the stack manager to perform a stack pop or push, respectively. The message specific data area indicates the type of the data; for data types which have no value in the number stack or value fields, only the type information is transmitted.

The Restore Stack/End Restore message 191 is transmitted from the OEU 39 to the SMU 37 to indicate that values previously offloaded from the stack should be reloaded. (Note: the use of a large stack would make this command unnecessary.)

The 387COMMAND message 193 is transmitted to the OEU 39 whenever a 80387 command is to be executed. The OEU responds by performing the requested operation on one or more values at the top of the stack.

The CPUCOMMAND message 195 is sent to the OCU 35. which responds by sending a token (see FIG. 3B) over the bus 31 to the host microprocessor.

Input and Output Control Units

As mentioned above, the ICU and OCU are responsible for maintaining the interface between the formula processor and the host microprocessor. Tokens which are received by the BIU 33 (FIG. 2) for processing by the formula processor are relayed to the ICU 34, and tokens generated by the formula processor to be transmitted to the microprocessor by the BIU 33 are relayed to the OCU 35. Primarily, the ICU and OCU contain translation and routing circuitry for converting tokens into internal messages and vice-versa. These units also contain interface circuitry and registers for maintaining inbound or outbound communications until they can be transmitted to the host microprocessor or another unit via the CDB 36.

The ICU 34 is illustrated in FIG. 9A. Incoming tokens (received by the BIU 33 from the host microprocessor and forwarded to the ICU 34) are stored in an input buffer 200. As the ICU processes previously-received tokens, it retrieves newly-received tokens from the buffer 200 and routes them to the appropriate destination. To maximize the flow of data through the formula processor, the ICU issues a CPUFORMULA token (by sending a CPUCOMMAND message to the OCU 35) whenever the ICU's internal buffer is empty and there are no CPUFORMULA commands currently pending.

The first functional block in the ICU is the FP/387 block 202, which determines if an incoming token represents an 80387 command or a formula processor command. 80387 commands are routed to a standard 80387 command interpretation block 204; the resulting messages (which form a sequence including an Enter 387 Mode 171 message, one or more stack manipulation messages 187, 189, one or more Execute Operation messages 183, one or more 387COMMAND messages 193, and an Exit 387 Mode message 173) are transmitted to a local bus interface 208 and then onto the CDB 36. Formula processor commands are routed to a formula processor interpretation block 210, which converts the commands into the appropriate internal messages, which are then forwarded to the interface 208 and transmitted on the CDB 36.

The operation of the formula processor interpretation block 210 is described in FIG. 9B. Each of the possible input commands is tabulated, along with the resulting messages and the destination.

The FPINIT token 49 (which initializes the formula processor) causes the ICU 34 to broadcast a Reset message 165, which resets each unit in the formula processor to a known state, and a Save message 167, which saves that state.

The FPSTART token 51 (which starts a formula) causes the ICU 34 to broadcast a Save message 167, causing each unit to save its current state (in case the new formula being started is interrupting a formula being calculated).

The FPEND token 53 (which ends a formula) causes the ICU 34 to broadcast a Restore message 169, causing each unit to restore its saved state (if any) in order to continue calculating an interrupted formula.

The FPGIVENUM token 55 (which sends numeric data types to the formula processor stack) and the FPGIVETVS token 59 (which sends non-numeric data types to the formula processor stack) cause the ICU 34 to send a Push Stack Item message 189 to the SMU 37 (FIG. 2). The message specific area of the message 163 is encoded with the appropriate data type and the value to be placed on the number stack (if any).

The FPGETNUM token 57 (which retrieves numeric data types from the formula processor stack) and the FPGETTVS token 61 (which retrieves non-numeric data types from the formula processor stack) cause the ICU 34 to send a Send Stack Item message 187 to the SMU 37 (FIG. 2).

The FPFORMULA token 63 (which transmits formula bytes to the formula processor) causes the ICU 34 to send a Formula Bytes message 181 to the TIU 41 for interpretation. The formula bytes (which are encoded with the FPFORMULA token) are placed in the message-specific area 163 of the Formula Bytes message.

The FPENDARRAY token 65 (which signals the end of an array transmission) causes the ICU 34 to broadcast an Atomic Op message 177. During array value transmissions, the SMU 37 uses the Atomic Op message 177 to capture the data bus until transmissions are complete. When transmissions are complete, the ICU 34 signals this fact to the SMU 37, and simultaneously frees the data bus, by transmitting the Atomic Op message.

The FPGETSTATAX token 67 (which retrieves the status flags from the formula processor) causes the ICU 34 to send an Execute Operation message 183 to the OEU 39. The opcode encoded into the message specific area 163 of the Execute Operation message instructs the OEU 39 to retrieve its status flags and send them to the host microprocessor (via a suitably encoded CPUOPERATION token 79).

Figure 10:
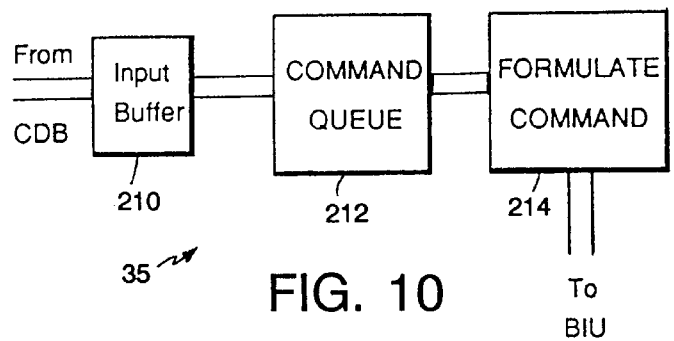
FIG. 10 is an architectural diagram of the output control unit of the formula processor of FIG. 2.

The architecture of the Output Control Unit 35 is illustrated in FIG. 10. As in the ICU 34, the OCU has an input buffer 210 for storing messages received from the CDB 36. The OCU, however, has an additional memory, command queue 212, for storing commands, the use of which will be discussed below.

The OCU receives only CPUCOMMAND messages 195; it prioritizes the messages based on the type of token to be generated by the message. The message-specific area of the CPUCOMMAND messages encode the type of token (see FIG. 3B) which is to be transmitted to the host microprocessor. Before the messages are transferred from the input buffer 210 to the command queue 212, the OCU determines what type of token each represents. Then, based on the token type, the messages are prioritized in the queue 212; relatively important token types are placed ahead of relatively unimportant tokens in the queue, as discussed below.

Generally, the presence of 'special request' (e.g., a message encoding a token other than CPUFORMULA, such as CPUOPERATION) in the OCU's input buffer indicates that the formula processor has reached a point in formula calculation which requires the host microprocessor's help, and that the formula processor has stopped processing formulas and is awaiting a reply. To keep the formula processor processing as much as possible, the OCU assigns a higher priority to these non-CPUFORMULA tokens than to CPUFORMULA tokens. This is accomplished by transferring messages encoding CPUFORMULA tokens from the input buffer 210 to the end of the command queue 212, but transferring all other tokens in order of receipt.

After CPUCOMMAND messages have been received and prioritized in this manner, the messages are sequentially sent to a command formulation element 214, which converts the message to the token type encoded in the message, and transmits the token to the BIU 33 for forwarding to the host microprocessor.

Note that, in a 80387/80386-based implementation, the host microprocessor must request tokens from the formula processor before they will be forwarded by the OCU.

Token Interpreter

The token interpreter unit TIU 41 is illustrated in FIG. 11A. The TIU is responsible for interpreting formula bytes received from the host microprocessor and for issuing the corresponding messages to the SMU 37 or OEU 39. Formula Bytes messages from the ICU 34 are received and stored in an input buffer 216. The messages are then read from the buffer by a token lookup element 218, which reads the formula bytes from the message and determines whether the formula bytes require a stack operation (e.g., a number or value push) or a mathematical/logical/string operation (e.g., a multiplication).

FIG. 11B is a table of the operation codes (OPCODEs) that may be encoded into formula bytes, and indicates the actions taken by the TIU in response.

If the received formula bytes require a mathematical/logical/string operation, the TIU token lookup element 218 determines whether the required operation is supported by the OEU. If the operation is supported by the OEU (226), the formulate command element 222 generates the appropriate Execute Operation message 183, addresses it to the OEU, and delivers it to the local bus interface element 224 for transmission.

Alternatively, if the operation called for by the formula bytes is not supported by the OEU 228, the TIU returns the operation to the host microprocessor for further processing. In this case, the formulate command element 222 generates a CPUCOMMAND message 195, addresses the message to the OCU, and delivers the message to the local bus interface for transmission.

If the formula bytes require a number push, the TIU checks the type of number. Numbers may be represented in formula bytes in a short, integer format (known as the SNUM format 232) or in a scientific notation, real number format (known as the TREAL format 230) similar to that used in the number stack. If the number is represented as an SNUM the TIU uses a number convert element 220 to convert the number to a real number format (TREAL numbers do not require conversion). Number conversion is performed by the TIU rather than the SMU because it is believed that the TIU will be less busy than the SMU, and therefore that placing this function in the TIU will enhance the overall speed of the formula processor. After conversion (if conversion is necessary), the TIU formulate command element 222 generates a Push Stack Item message 189, incorporates the formatted number, addresses the message to the SMU 37, and delivers it to the local bus interface element 224 for transmission.

Ranges 234 are pushed directly on the stack without being resolved, by generating a Push Stack Item message, with the encoded type and value indicating that the item is a range and indicating the range boundaries, and with the encoded number field set to 0.

Error values 236 and error ranges 238 are also pushed directly on the stack, with the type/value field indicating the error type and the number field set to ERR.

Stack Management Unit

The stack management unit SMU 37 is the only functional unit which directly manages the stacks (the OEU manipulates the stacks as part of operations, but cannot perform independent pushes and pops). Thus, all messages which push or pop values on or off the stack are addressed to the SMU. Furthermore, the SMU exclusively manages the cell cache, and also handles requests from the OEU to resolve an unresolved range or cell on the stack.

Figure 12A:
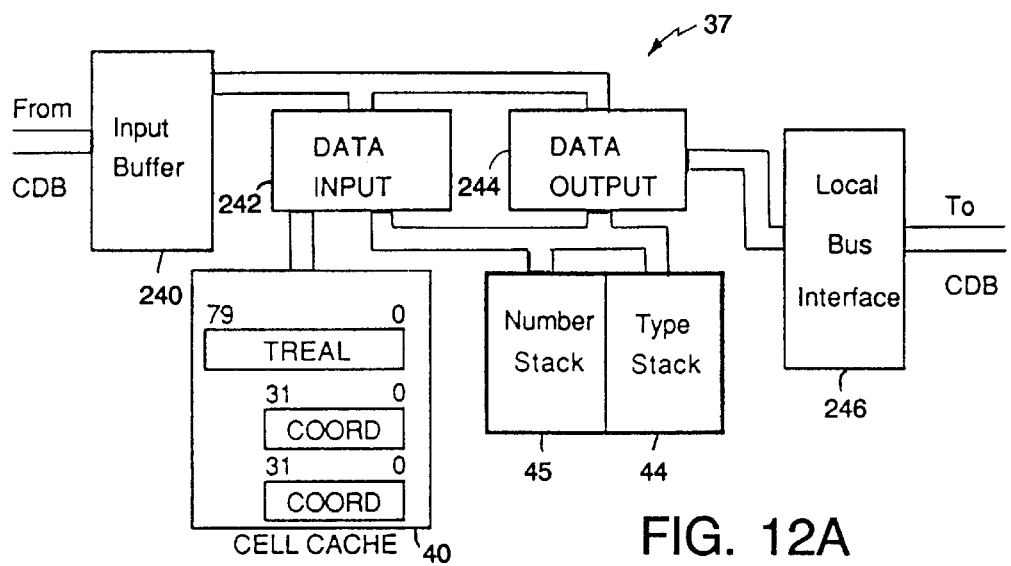
FIG. 12A is an architectural diagram of the stack management unit of the formula processor of FIG. 2.

The architecture of the SMU 37 is illustrated in FIG. 12A. An input buffer 240 receives incoming messages and relays them to either a Data Input element 242 (which is responsible for pushing data on the stacks 44, 45 and storing data in the cache 40) or a Data Output element 244 (which is responsible for popping data from the stacks and transmitting it to other functional units). Data popped from the stacks is placed on the CDB for transmission via a local bus interface unit 246.

The cell cache 40 may contain one or more entries, one being illustrated in FIG. 12A. Each entry stores a TREAL 80-bit value as well as the cell coordinates (or, for non-spreadsheet applications, another identifier). The contents of the cache are created and maintained as follows: whenever a value for a cell is computed by the formula processor (completion of a computation is indicated by a FORMULA DONE message) the SMU stores the computed value and its cell coordinates in the cell cache in the place of a previous entry in the cell cache. The replaced entry may be the least-recently-used entry (in which case the cache would be designed to track the cache usage, for example by storing the cache entries in a linked list, moving entries to the head of the list when used, and re-using entries from the tail of the list) or may be the least-recently-entered entry (in which case the cache would be designed to store the entries in the order in which they were added, e.g. with a pointer which increments each time an entry is added).

The entries of the cell cache are used as follows: whenever the TIU receives a Push Stack Item message 189 encoding an unresolved cell reference, the data input element 242 sends the coordinates of the cell to the cache 40, which compares the coordinates to those of each cell stored in the cache. If there is a match, the value stored in the cache for that coordinate is returned to the data input element 242, and the returned value, rather than the unresolved cell reference, is pushed onto the stack. As a result, when possible cell references are immediately resolved using the cache, thus avoiding future communication between the OEU 39 and the SMU 37 to resolve the reference. Furthermore, because the value is resolved before it is placed on the stack, this operation is entirely transparent to the OEU 39.

It should be noted that, although every item pushed on the stack will eventually need to be resolved to allow computation by the OEU 39, the SMU resolves only cell references in advance. Range references, strings, and those cell references were not found in the cache are stored in an unresolved format (see FIG. 5), and are not resolved until their values are required by the OEU 39. This is done because, in may cases (particularly while a spreadsheet is being developed), a formula will have one or more invalid arguments (e.g., a string argument to a numeric function), and therefore will have an invalid value. In this case, the value for the formula is ERR regardless of the other arguments. Thus, often by checking only the type of the arguments to a formula, the OEU can determine that the formula has a value of ERR without ever resolving those arguments. Thus, by delaying resolution of arguments until type-checking has been completed, the formula processor can often avoid resolving the arguments at all. In some instances, this can substantially reduce the time required to calculate the values for a spreadsheet. Also, since the process of creating a spreadsheet involves continual recalculation, a reduction in calculation time can substantially impact the time needed to create a spreadsheet.

The SMU's responses to various messages are tabulated in FIG. 12B.

In response to the SAVE Message 167, the SMU copies the stack pointer from the NSP register 41 to the Saved NSP register 43, and then sets the stack pointer to the next stack entry, thus preparing for a second formula. In response to a Restore message 169, the SMU takes the opposite steps: the stack pointer is copied from the Saved NSP register 43 to the NSP register 41, which moves the stack pointer to the entry which was the top-of-stack (TOS) entry before the save.

As discussed above, receipt of a FORMULA DONE message causes the SMU's data input element 242 to read the TOS value and store it, along with its cell coordinates (which are found in the type/value stack), in the cache 40 for future reference.

Data is pushed on the stack with the Push Stack Item message 189. In response to this message, the data input element 242 push a value or reference onto the top of the stack. (If the item to be pushed is an unresolved cell reference, the data input element will first attempt to resolve the reference with the cache 40 as discussed above).

Stack items are popped with the Send Stack Item message 187. In response to this message, the data output element 244 removes the value from the top of the stack, encodes it in a CPUCOMMAND message 195 (which itself encodes a CPUOFFLOAD token carrying the stack value), addresses the message to the OCU, and forwards the message to the local bus interface 246 for transmission.

As discussed above, if there is a stack overflow (which may happen if the stack is short) the SMU will automatically initiate a stack offload to the CPU. After an offload has occurred, the OEU 39 may attempt to perform an operation on one or more values that have been previously offloaded from the stack. In this case, the OEU will transmit a Restore Stack message 191 to the SMU. In response, the SMU will send an Atomic Op message 177 to the ICU, locking other functional units off of the bus, and then issue a CPUCOMMAND to the OCU encoding a CPURELOAD token 77 which requests that the host microprocessor restore the offloaded stack items. Thereafter, the host microprocessor will send the offloaded stack items, and the data input element 242 will push each on the stack. Once m values have been reloaded, the SMU will send an Atomic Op message 177 to free the CDB and then send an End Restore message 191 to the OEU, indicating that the stack is ready for processing.

As discussed above, the SMU responds to an Enter 387 Mode message 171 by saving the top eight entries of the number stack 45 to the shadow number stack 46, and saving the stack pointer from the NSP register 41 to the Shadow NSP register 42. The SMU responds to an Exit 387 Mode message in the opposite fashion: the stack pointer is copied from the Shadow NSP register 42 to the NSP register 41, and the contents of the shadow number stack 46 are copied to the first eight entries of the number stack.

Finally, the SMU responds to a Resolve Stack Item message 185 (which is generated by the OEU 39 when the OEU attempts to perform an operation on an unresolved operand in the stack) by removing the value from the stack and sending the appropriate CPUCOMMAND message to the OCU. If the value to be resolved is a range or string, the CPUCOMMAND message encodes a CPUARRAY token 69 indicating the endpoints of the range or a pointer to the first byte of the string. Alternatively, if the value to be resolved is a cell, the CPUCOMMAND message encodes a CPUVARIABLE token 71 indicating the coordinates of the cell.

Operation Execution Unit

The operation execution unit OEU 39 is responsible for executing all formula processor numeric operations and all 80387 operations. It can be designed with the same form and control as the Floating Point Unit in the 80387, with appropriate microcode additions to execute formula processor-specific mathematical operations.

The OEU reads information for calculations from the number stack 45 and the type/value stack 44. Special micro-coded routines (1) verify that the correct number of operands are on the number stack 45, (2) request a Stack Reload whenever there are insufficient operands, and (3) request resolution of a range and cell value from the SMU 37 whenever the data in the entry of the number stack 45 to be used is not a number.

As discussed above, whenever the OEU requests resolution of a value from the SMU (with a Resolve Stack Item message 185), it monitors the corresponding stack entry and performs the pending computation on the value scored in the entry as soon as the new bit of the entry is set.

A list of the functions which can be supported by the OEU 39, and identifiers for the functions, is provided below. Note that, for simplicity of implementation, the opcodes for the functions should be selected so that those formula processor functions which are supported by the standard 80387 Floating Point Unit use the same opcodes as the standard 80387 functions, and the formula processor specific functions use opcodes which are not used by the 80387 Floating Point Unit. Also, note that string functions are storage-space intensive, and for this reason they are less likely candidates for computation by the formula processor. Also, note that the equality test function may be implemented for numbers only, because determining equality for other data types (e.g., strings, which can have arbitrary length) can be so computation intensive that the chip area required to implement these functions may not be worth the processing time gained.

Mathematical Functions

| Mathematical Functions | |
|---|---|
| ATAN2 | Four-quadrant arctangent |
| AVG | Average all cells in a range |
| CTERM | Compounding Periods required for an investment to grow to a given value |
| DAY | Get the day of the month from a datenumber |
| DDB | Double-declining balance |
| D360 | Number of days between two datenumbers based on a 360 day year |
| ERR | Value ERR |
| EXP | $e^x$ for a specified value x |
| FALSE | Logical 0 |
| FV | Future value |
| HOUR | Get the hour from a timenumber |
| IF | Assign value based on condition |
| IRR | Internal rate-of-return |
| ISERR | Tests whether a cell value is ERR |
| ISNA | Tests whether a cell value is NA |
| ISNUMBER | Tests whether a cell value is a number |
| LN | $\log_e x$ |
| LOG | $\log_{10} x$ |
| MAX | Largest value in a range |
| MIN | Smallest value in a range |
| MINUTE | Get the minute from a timenumber |
| MOD | Modulo x/y for a specified x and y |
| MONTH | Get the month from a datenumber |
| NA | Value NA |
| NPV | Net present value |
| PMT | Periodic payment to pay off a loan |
| PV | Present value |
| RAND | Random number between 0 and 1 |
| RATE | Periodic interest rate for investment to grow to a future value in a given number of compounding periods |
| RMUL | Multiply all values in a list |
| ROUND | Round to a specified number of decimal places |
| SECOND | Get the seconds from a timenumber |
| SLN | Straight-line depreciation |
| STD | Population standard deviation of a list |
| STDS | Sample standard deviation of a list |
| SUM | Sum the values in a range |
| SUMPRODUCT | Sum the values in a range then multiply the sums |
| SYD | Sum-of-the-year's-digits depreciation |
| TERM | Number of payment periods in a term necessary to accumulate a future value |
| TIME | Timenumber for specified hour, minute, second values |
| TRUE | Logical 1 |
| VAR | Population variance of a list |
| VARS | Sample variance of a list |
| VDB | Depreciation for a given rate |
| YEAR | Get the year from a datenumber |

Mathematical/Logical Functions

| | |
|---|---|
| UPLU | Unary Plus |
| UMNU | Unary Minus |
| POW | $x^y$ for a specified x and y |
| AND | Logical AND |
| OR | Logical OR |
| NOT | Logical NOT |
| EQ | Test for equality |
| NE | Test for inequality |
| LE | Test for less-than-or-equal |
| GE | Test for greater-than-or-equal |
| LT | Test for less-than |
| GT | Test for greater-than |

String Functions

| | |
|---|---|
| & | Concatenate two strings |
| DATEVALUE | Date number for a date specified as a string |
| EXACT | Compare two strings for exact equality |
| FIND | Find a search string in a string |
| FORMAT | Create a formatted number string from a number |
| LEFT | Get leftmost n characters from a string, for a specified n |
| LENGTH | Get length of a string |
| LOWER | Convert a string to lowercase |
| MID | Get a specified number of characters in a string starting at a specified position |
| PROPER | Convert string to proper capitalization |
| REPEAT | Duplicate a string a specified number of times |
| REPLACE | Replace a part of a string with another string |
| RIGHT | Get last n characters in a string, for a specified n |

-continued

| STRING | Convert value into string with a specified number of decimal places |
|---|---|
| TIMEVALUE | Timenumber from a time specified as a string |
| TRIM | Remove leading, trailing, and consecutive spaces from a string |
| UPPER | Convert string to uppercase |
| VALUE | Convert a string to a number |

Bus Control Unit

Referring to FIG. 2, the use of the common data bus 36 is controlled by a bus control unit 38, which determines which of the other units 34, 35, 37, 39, and 41 may use the bus for communication at any given time. Use of the data bus is prioritized; the OEU 39 has highest priority, followed by the SMU 37, TIU 41, ICU 34, and then the OCU 35, which has the lowest priority. The priority of these units is established by "Bus Grant" lines 48A, 48B, 48C, 48D, and 48E; each of the units on the CDB 39 has one input and one output connected to a "Bus Grant" line 48, and these lines chain the various units together in order of their priority.

In brief summary, each of the "Bus Grant" lines 48 carries a signal indicating whether the bus is available to the unit receiving the signal. These signals travel from high-priority units to lower-priority units, in a chain-like fashion. A unit may only use the bus only if it receives the "Bus Grant" signal from the next-higher-priority unit, indicating that none of the higher-priority units are using the bus.

Figure 13:
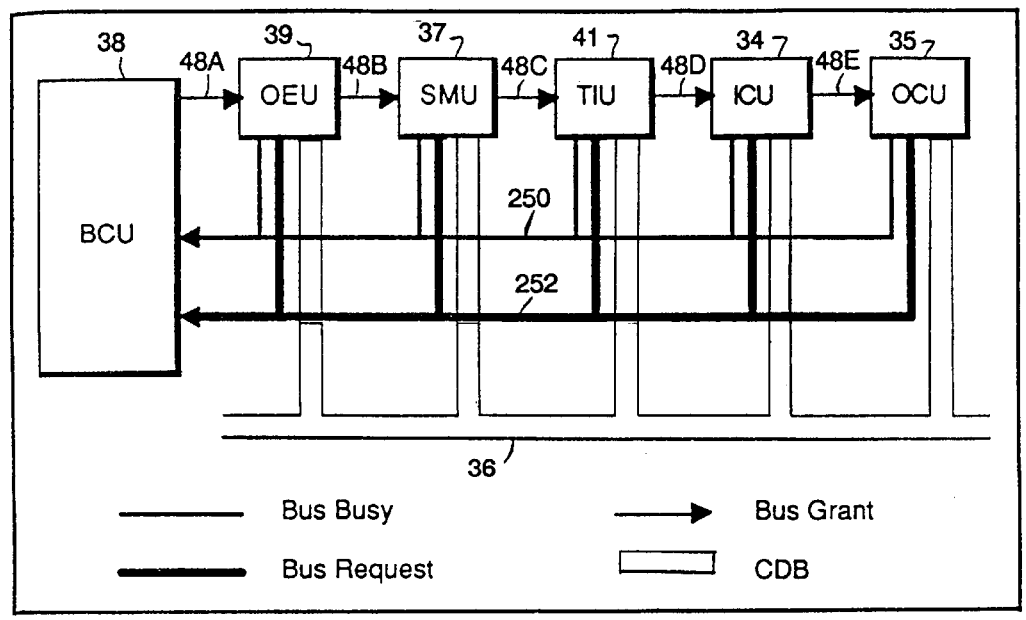
FIG. 13 is simplified version of FIG. 2 illustrating the manner in which a bus control unit controls the use of the common data bus of the formula processor.

The details of the bus arbitration scheme are illustrated more completely in FIG. 13. The BCU 36 interacts with each of the units through 3 lines: the "Bus Grant" line 48, a "Bus Busy" line 250, and a "Bus Request" line 252. Before continuing, it should be noted that lines 250 and 252 form a "wired-OR" of information collected from all of the units, because they are configured, in well known fashion, so that any unit may assert a "1" signal on the line, but the line will only carry a "0" signal if no units are asserting a "1" state. (Note that, for the purposes of the following discussion, a "1" signal may be a "high" or "low" signal, depending on the logic convention in use.)

The units use these lines as follows:

When a unit is not using the bus and does not need to use the bus, it does not assert a "1" on either of the "Bus Request" or "Bus Busy" lines 250 and 252, and simply passes any signal received at its "Bus Grant" input line 48 to its "Bus Grant" output line 48.

When a unit needs to use the bus, it asserts a "1" signal on the "Bus Request" line 252, indicating to the BCU 38 that at least one unit is requesting the bus. At the same time, the unit also asserts a "0" on its "Bus Grant" output line 48, indicating that its request takes priority over requests of lower-priority units (i.e., that, as far as lower-priority units are concerned, the bus is unavailable and will remain unavailable until the higher-priority unit's request has been satisfied).

After a unit has requested the bus (by asserting a "1" signal on the "Bus Request" line 252), it waits until a "1" signal is received on its respective "Bus Grant" input line 48. This indicates that the bus is available and is not being requested by any higher-priority units. The unit then asserts a "1" signal on the "Bus Busy" line 250, indicating that the bus is now being used, and begins sending its messages. While the bus is being used, the unit using the bus continues to assert a "1" on the "Bus Busy" line 250 and continues to assert a "0" on its respective "Bus Grant" output line 48. When the unit is finished using the bus, it signals this by ceasing to assert a "1" signal on the "Bus Busy" line, and ceasing to assert a "0" on its "Bus Grant" output line 48; thereafter, any signal received at the unit's "Bus Grant" input line 48 is driven onto the unit's "Bus Grant" output line 48.

The BCU 38 interacts with the units as follows:

If the "Bus Request" line is not asserted, the BCU 38 will not assert the "Bus Grant" signal.

If the "Bus Busy" line is asserted, the BCU 38 will not assert the "Bus Grant" signal.

If (and only if) the "Bus Request" line is asserted and the "Bus Busy" line is not asserted, the BCU 38 will assert the "Bus Grant" signal.

The above has the following results:

Once a unit has been granted the bus, no other units can use the bus until the unit using the bus is finished.

If the bus is busy and one or more units request it, when the bus becomes available it will be granted to the unit having the highest priority.

If the bus is not busy, it will be granted to any unit which requests it.

Note that, under the above description, there is a possible race condition. Under some narrowly timed circumstances (e.g., the bus is not busy and two units request it nearly simultaneously, the lower-priority unit just before the higher-priority unit), two units may attempt to use the bus simultaneously.

One way to avoid this possibility is to synchronize the BCU 38 and the other functional units, so that each unit updates the signals on the bus control lines at the same time, for example at the edge of a master clock signal.

Another way to avoid the race condition is to design each of the functional units to adhere to the following timing restrictions:

1. The unit must assert a "0" on its "Bus Grant" output 48 before it asserts a "1" on the "Bus Request" line 252. This prevents any lower-priority units from reading a "1" level on the "Bus Grant" lines 48 after the higher-priority unit requests the bus.

2. The unit must wait for a given time period after it asserts a "0" on its "Bus Grant" output before it can poll the "Bus Grant" input signal to determine if the bus is available. This time period must be equal to or greater than the propagation delay required: (1) for a unit to respond to a "Bus Grant" signal on its input line 48 and assert a "Bus Busy" signal on line 250, and (2) for the BCU 38 to respond to the "Bus Busy" signal and subsequently assert a "0" signal on all of the "Bus Grant" lines 48. This prevents a unit from reacting to transitory "1" signals on the "Bus Grant" line which may occur after a lower-priority unit has taken over the bus, but before there has been sufficient time for the BCU 38 to assert a "0" signal on the "Bus Grant" lines 48. (An alternative way to accomplish the same purpose is for the units to time the length of the "Bus Grant" signal; to be valid, a "1" signal on the "Bus Grant" line 48 must remain on the bus after the assertion of "Bus Request" longer than the propagation delay described above.)

Note that the propagation delay described above also describes the minimum clock period that can be used in a synchronous implementation.

Other Embodiments

Other embodiments of the invention are within the scope of the following claims. For example, the formula processor may be implemented in software rather than in hardware. In this case, the communications paths 27 and 29 illustrated in FIG. 2 may be implemented with registers and fixed storage locations rather than as busses, and the various elements of the formula processor may be implemented by routines running in a time-shared fashion on a single microprocessor rather than as circuit elements. In this case, the computations of the computation element 21 may be performed by the microprocessor's internal arithmetic/logic unit (ALU), and the operand storage stack 25 may be the microprocessor's stack.

In this type of software implementation, the cache may be implemented by a set of fixed locations in memory which store the identifier(s) (e.g., spreadsheet coordinate(s)) of one or more recently computed formula(s) and the value(s) of the formula(s). Although a cache of this type is read and written by software rather than hardware, and therefore will not typically operate as rapidly as a hardware implementation such as described above, a software cache can still substantially shorten the time necessary to compute formulas. Spreadsheet programs, and most other programs which manage large amounts of data, use an elaborate indexing scheme to tabulate the locations of the managed data. As a result, reading data from memory involves a long sequence of retrieval and/or mathematical operations, finally leading to a pointer to the required data. The time required for this process of retrieving and/or generating the desired pointer is substantially larger than time required to read data from memory once the pointer is generated. Thus, reading a formula value from the software cache can be substantially faster than reading the same value from memory, because the memory location of the cache is fixed and therefore known in advance. As a result, the time required to read the identifier for a cached formula value, determine that the cached value is the desired value (i.e., identify a "hit"), and retrieve the cached value, can be substantially shorter than the time required to read the formula value from memory (the time savings may be as large as a factor of 10). Furthermore, the time lost in a cache "miss" is only the relatively short length of time required for a single memory access and compare operation. These facts, coupled to empirical tests which indicate that 90% of the formulas in a typical spreadsheet use the value of the next-previous formula, indicate that even a very small software cache, e.g., a one element cache which stores the most recently computed value, can substantially reduce the time required to compute the formulas on a spreadsheet.

We claim:

1. A computer system having a formula processor which computes results for a plurality of formulas, wherein at least a first of said formulas is associated with an identifier and at least a second of said formulas may include said identifier and the result of said first formula, comprising a host which topologically sorts said formulas before transmitting said formulas to said formula processor by determining which formulas use the results of other formulas, such that each formula which uses the result of an other formula is received by said formula processor after said other formula, and during said sort, if said second formula is determined to use the result of said first formula, dependency information, indicating that the result of said first formula is used by one or more subsequent formulas, is generated by said host and transmitted to said formula processor with said formulas, an interface which receives said formulas and said dependency information from said host and returns computed results for said formulas to said host for storage in a main memory, a computation element which computes said results by performing operations in response to formulas received by said interface, a cache memory which stores the result of a formula and an identifier to be used with other formulas in identifying said formula, and a cache manager which, after computation of a result for said first formula by said computation element, examines said dependency information associated with said first formula in said cache memory if said dependency information indicates that the result of said first formula computed by said computation element is used by subsequent formulas, said cache manager retrieves the result of said first formula from said cache memory using said identifier from said second formula, and then uses the retrieved result of said first formula in computing a result for said second formula.

2. A method of computing results for a plurality of formulas, wherein at least a first of the formulas is associated with an identifier and at least a second of the formulas may include the identifier and use the result of the first formula, the method comprising the steps of topologically sorting the formulas by determining which formulas use the results of other formulas, such that each formula which uses the result of an other of the formulas is computed after the other formula, during said sorting, if the second formula is determined to use the result of the first formula, generating dependency information indicating that the result of the first formula is used by one or more subsequent formulas, computing said results by performing operations on the formulas after computation of a result of the first formula, examining the dependency information associated with the first formula, and storing said result and the identifier associated with the first formula in a cache memory, if the dependency information indicates that the result of the first formula is used by subsequent formulas, and retrieving the result of the first formula from the cache memory using the identifier from the second formula, and using the retrieved result of the first formula in computing a result for the second formula.

3. A computer program product for use with a computer system having a cache memory, the computer program product comprising:

a computer usable medium having embodied in the medium program code configured to compute the results of a plurality of formulas, at least a first of the formulas having the identifier associated therewith and a second of the formulas which may include said identifier and use the results of the first formula, the computer usable medium further comprising:

program code configured to topologically sort said formulas by determining which formulas use the results of other formulas, such that each formula which uses the result of another of said formulas is computed after said other formula;

program code configured to generate dependency information indicating that the result of the first formula is used by one or more subsequent formulas, if the second formula is determined to use the result of the first formula;

program code configured to compute said results by performing operations on said formulas;

program code configured to examine the dependency information associated with the first formula, after computation of the result of the first formula, and to store said result and the identifier associated with the first formula in the cache memory if said dependency information indicates that the result of the first formula is used by subsequent formulas; and program code configured to retrieve the result of the first formula from the cache memory using the identifier from the second formula and to use the retrieved result of the first formula in computing a result for the second formula.

* * * * *